(12) United States Patent
Russo et al.

(10) Patent No.: US 7,587,072 B2
(45) Date of Patent: Sep. 8, 2009

(54) SYSTEM FOR AND METHOD OF GENERATING ROTATIONAL INPUTS

(75) Inventors: Anthony P. Russo, New York, NY (US); David L. Weigand, Santa Clara, CA (US)

(73) Assignee: AuthenTec, Inc., Melbourne, FL (US)

( * ) Notice: Subject to any disclaimer, the term of this patent is extended or adjusted under 35 U.S.C. 154(b) by 106 days.

(21) Appl. No.: 10/912,655

(22) Filed: Aug. 4, 2004

(65) Prior Publication Data

US 2005/0041885 A1 Feb. 24, 2005

Related U.S. Application Data

(60) Provisional application No. 60/497,045, filed on Aug. 22, 2003.

(51) Int. Cl.
*G06K 9/00* (2006.01)
(52) U.S. Cl. ...................................... 382/124
(58) Field of Classification Search ........................ None
See application file for complete search history.

(56) References Cited

U.S. PATENT DOCUMENTS

| | | | |
|---|---|---|---|
| 1,660,161 A | 2/1928 | Hansen | |
| 1,683,059 A | 9/1928 | Van Deventer | |
| 3,393,390 A | 7/1968 | Louis | |
| 3,610,887 A | 10/1971 | Betzer | 219/501 |
| 3,621,439 A | 11/1971 | Newbery | 338/180 |
| 3,624,584 A | 11/1971 | Ohno | 338/69 |
| 3,863,195 A | 1/1975 | Bowen | 338/183 |
| 3,960,044 A | 6/1976 | Nagai et al. | 84/1.01 |
| 3,997,863 A | 12/1976 | Luce | 338/69 |
| 4,152,304 A | 5/1979 | Tadewald | 252/506 |
| 4,257,305 A | 3/1981 | Friend et al. | 84/1.24 |

(Continued)

FOREIGN PATENT DOCUMENTS

DE 19606408 A1 8/1997

(Continued)

OTHER PUBLICATIONS

I-Control, PDS 3000 TM Product Brief "*Mobile Finger-Based Control Sensor*", 2 pages, Jul. 2003.

(Continued)

*Primary Examiner*—Matthew C Bella
*Assistant Examiner*—Alex Liew
(74) *Attorney, Agent, or Firm*—Allen, Dyer, Doppelt, Milbrath & Gilchrist, P.A.

(57) ABSTRACT

A system for and method of obtaining rotation information is disclosed. The method comprises capturing a plurality of patterned images from a plurality of locations, correlating the plurality of patterned images to generate sets of linear differences, and using the sets of linear differences to generate the rotation information. Preferably, the plurality of locations comprise a first part of a fingerprint swipe sensor and a second part of the fingerprint swipe sensor, each part configured to capture a part of a fingerprint image. Each part captures a part of the fingerprint image at two positions and correlates the parts at the two positions to determine one set of linear differences. Together, the sets of linear differences are used to calculate the rotation information, which can be used to emulate a rotational device such as a steering wheel, a joystick, or a navigation bar.

74 Claims, 7 Drawing Sheets

U.S. PATENT DOCUMENTS

| | | | |
|---|---|---|---|
| 4,273,682 A | 6/1981 | Kanomori | 252/511 |
| 4,333,068 A | 6/1982 | Kishel | 338/158 |
| 4,419,653 A | 12/1983 | Waigand | 338/114 |
| 4,438,158 A | 3/1984 | Eichelberger et al. | 427/101 |
| 4,479,392 A | 10/1984 | Froeb et al. | 73/862.68 |
| 4,604,509 A | 8/1986 | Clancy et al. | 200/159 B |
| 4,745,301 A | 5/1988 | Michalchik | 307/119 |
| 4,746,894 A | 5/1988 | Zeldman | 338/99 |
| 4,765,930 A | 8/1988 | Mashimo et al. | 252/511 |
| 4,775,765 A | 10/1988 | Kimura et al. | 178/18 |
| 4,827,527 A | 5/1989 | Morita et al. | 382/4 |
| 4,833,440 A | 5/1989 | Wojtanek | 338/114 |
| 4,878,040 A | 10/1989 | Tamura | 338/158 |
| 4,933,660 A | 6/1990 | Wynne, Jr. | 338/114 |
| 4,952,761 A | 8/1990 | Viebrantz | 200/513 |
| 5,060,527 A | 10/1991 | Burgess | 73/862.68 |
| 5,068,638 A | 11/1991 | Bickely et al. | 338/114 |
| 5,162,775 A | 11/1992 | Kuramochi et al. | 338/114 |
| 5,164,697 A | 11/1992 | Kramer | 338/69 |
| 5,283,735 A | 2/1994 | Gross et al. | 364/413.02 |
| 5,296,835 A | 3/1994 | Nakamura | 338/130 |
| 5,327,161 A | 7/1994 | Logan et al. | 345/157 |
| 5,376,913 A | 12/1994 | Pine et al. | 338/114 |
| 5,429,006 A | 7/1995 | Tamori | 73/862.046 |
| 5,499,041 A | 3/1996 | Brandenburg et al. | 345/174 |
| 5,610,993 A | 3/1997 | Yamamoto | 382/124 |
| 5,612,719 A | 3/1997 | Beernink et al. | 345/168 |
| 5,614,881 A | 3/1997 | Duggal et al. | 338/22 R |
| 5,621,318 A | 4/1997 | Jacobsen et al. | 324/207.22 |
| 5,644,283 A | 7/1997 | Grosse-Wilde et al. | 338/20 |
| 5,657,012 A | 8/1997 | Tait | 341/20 |
| 5,666,113 A | 9/1997 | Logan | 341/34 |
| 5,675,309 A | 10/1997 | DeVolpi | 338/68 |
| 5,689,285 A | 11/1997 | Asher | 345/161 |
| 5,740,276 A | 4/1998 | Tomko et al. | 382/210 |
| 5,821,930 A | 10/1998 | Hansen | 345/340 |
| 5,825,352 A | 10/1998 | Bisset et al. | 345/173 |
| 5,825,907 A | 10/1998 | Russo | 382/124 |
| 5,828,773 A | 10/1998 | Setlak et al. | |
| 5,841,888 A | 11/1998 | Setlak et al. | |
| 5,845,005 A | 12/1998 | Setlak et al. | |
| 5,852,670 A | 12/1998 | Setlak et al. | |
| 5,862,248 A | 1/1999 | Salatino et al. | |
| 5,876,106 A | 3/1999 | Kordecki | 362/29 |
| 5,880,411 A | 3/1999 | Gillespie et al. | 178/18.01 |
| 5,889,507 A | 3/1999 | Engle et al. | 345/161 |
| 5,903,225 A | 5/1999 | Schmitt et al. | |
| 5,907,327 A | 5/1999 | Ogura et al. | 345/339 |
| 5,909,211 A | 6/1999 | Combs et al. | 345/172 |
| 5,910,286 A | 6/1999 | Lipskier | |
| 5,912,612 A | 6/1999 | DeVolpi | 338/95 |
| 5,920,640 A | 7/1999 | Salatino et al. | |
| 5,940,526 A | 8/1999 | Setlak et al. | |
| 5,943,052 A | 8/1999 | Allen et al. | 345/341 |
| 5,945,929 A | 8/1999 | Westra | 341/34 |
| 5,949,325 A | 9/1999 | Devolpi | 338/154 |
| 5,953,441 A | 9/1999 | Setlak | |
| 5,956,415 A | 9/1999 | McCalley et al. | |
| 5,963,679 A | 10/1999 | Setlak | |
| 5,982,894 A | 11/1999 | McCalley et al. | |
| 5,995,084 A | 11/1999 | Chan et al. | 345/173 |
| 5,995,623 A | 11/1999 | Kawano et al. | 380/21 |
| 5,995,630 A | 11/1999 | Borza | 380/54 |
| 5,999,084 A | 12/1999 | Armstrong | 338/114 |
| 6,011,589 A | 1/2000 | Matsuura et al. | |
| 6,011,849 A | 1/2000 | Orrin | 380/42 |
| 6,021,211 A | 2/2000 | Setlak et al. | |
| 6,028,773 A | 2/2000 | Hundt | |
| 6,035,398 A | 3/2000 | Bjorn | 713/186 |
| 6,047,281 A | 4/2000 | Wilson et al. | |
| 6,047,282 A | 4/2000 | Wilson et al. | |
| 6,057,540 A | 5/2000 | Gordon et al. | 250/221 |
| 6,057,830 A | 5/2000 | Chan et al. | 345/157 |
| 6,061,051 A | 5/2000 | Chan et al. | 345/173 |
| 6,061,464 A | 5/2000 | Leger | |
| 6,067,368 A | 5/2000 | Setlak et al. | |
| 6,069,970 A | 5/2000 | Salatino et al. | |
| 6,070,159 A | 5/2000 | Wilson et al. | |
| 6,088,471 A | 7/2000 | Setlak et al. | |
| 6,088,585 A | 7/2000 | Schmitt et al. | 455/411 |
| 6,098,330 A | 8/2000 | Schmitt et al. | |
| 6,135,958 A | 10/2000 | Mikula-Curtis et al. | 600/443 |
| 6,141,753 A | 10/2000 | Zhao et al. | 713/176 |
| 6,181,807 B1 | 1/2001 | Setlak et al. | |
| 6,208,329 B1 | 3/2001 | Ballare | 345/173 |
| 6,219,793 B1 | 4/2001 | Li et al. | 713/202 |
| 6,219,794 B1 | 4/2001 | Soutar et al. | 713/202 |
| 6,239,790 B1 | 5/2001 | Martinelli et al. | 345/174 |
| 6,248,655 B1 | 6/2001 | Machida et al. | 438/597 |
| 6,256,012 B1 | 7/2001 | Devolpi | 345/161 |
| 6,256,022 B1 | 7/2001 | Manaresi et al. | 345/174 |
| 6,259,804 B1 | 7/2001 | Setlak et al. | 382/124 |
| 6,278,443 B1 | 8/2001 | Amro et al. | 345/173 |
| 6,289,114 B1 | 9/2001 | Mainguet | 382/124 |
| 6,317,508 B1 | 11/2001 | Kramer et al. | 382/124 |
| 6,323,846 B1 * | 11/2001 | Westerman et al. | 345/173 |
| 6,330,345 B1 | 12/2001 | Russo et al. | 382/115 |
| 6,337,918 B1 | 1/2002 | Holehan | 382/124 |
| 6,344,791 B1 | 2/2002 | Armstrong | 338/114 |
| 6,376,393 B1 | 4/2002 | Newton et al. | |
| 6,400,836 B2 | 6/2002 | Senior | |
| 6,404,323 B1 | 6/2002 | Schrum et al. | 338/92 |
| 6,404,900 B1 | 6/2002 | Qian et al. | 382/103 |
| 6,408,087 B1 | 6/2002 | Kramer | 382/124 |
| 6,437,682 B1 | 8/2002 | Vance | 338/185 |
| 6,442,286 B1 | 8/2002 | Kramer | |
| 6,459,804 B2 | 10/2002 | Mainguet | 382/124 |
| 6,483,931 B2 | 11/2002 | Kalnitsky et al. | |
| 6,501,284 B1 | 12/2002 | Gozzini | |
| 6,512,381 B2 | 1/2003 | Kramer | |
| 6,515,488 B1 | 2/2003 | Thomas | |
| 6,518,560 B1 | 2/2003 | Yeh et al. | 250/214 |
| 6,535,622 B1 | 3/2003 | Russo et al. | 382/124 |
| 6,546,122 B1 | 4/2003 | Russo | 382/125 |
| 6,563,101 B1 | 5/2003 | Tullis | 250/208.1 |
| 6,580,816 B2 | 6/2003 | Kramer et al. | |
| 6,601,169 B2 | 7/2003 | Wallace, Jr. et al. | 713/151 |
| 6,603,462 B2 | 8/2003 | Matusis | 345/173 |
| 6,628,812 B1 | 9/2003 | Setlak et al. | |
| 6,654,484 B2 | 11/2003 | Topping | 382/124 |
| 6,661,631 B1 | 12/2003 | Meador et al. | 361/93.1 |
| 6,664,951 B1 | 12/2003 | Fujii et al. | 345/173 |
| 6,667,439 B2 | 12/2003 | Salatino et al. | |
| 6,668,072 B1 | 12/2003 | Hribernig et al. | 382/124 |
| 6,681,034 B1 | 1/2004 | Russo | 382/125 |
| 6,683,971 B1 | 1/2004 | Salatino et al. | |
| 6,744,910 B1 | 6/2004 | McClurg et al. | 382/124 |
| 6,754,365 B1 * | 6/2004 | Wen et al. | 382/100 |
| 6,804,378 B2 | 10/2004 | Rhoads | 382/100 |
| 6,876,756 B1 | 4/2005 | Vieweg | 382/124 |
| 6,961,452 B2 | 11/2005 | Fujii | 382/125 |
| 7,002,553 B2 | 2/2006 | Shkolnikov | 345/169 |
| 7,003,670 B2 | 2/2006 | Heaven et al. | 713/186 |
| 7,020,270 B1 | 3/2006 | Ghassabian | 379/368 |
| 7,054,470 B2 | 5/2006 | Bolle et al. | 382/124 |
| 7,113,179 B2 | 9/2006 | Baker et al. | 345/178 |
| 7,136,514 B1 | 11/2006 | Wong | 382/124 |
| 7,197,168 B2 | 3/2007 | Russo | 382/125 |
| 7,263,212 B2 | 8/2007 | Kawabe | 382/124 |
| 7,280,679 B2 | 10/2007 | Russo | 382/124 |
| 7,299,360 B2 | 11/2007 | Russo | 713/182 |
| 7,339,572 B2 | 3/2008 | Schena | 345/156 |
| 7,369,688 B2 | 5/2008 | Ser et al. | 382/124 |
| 2001/0012036 A1 | 8/2001 | Giere et al. | 347/62 |

| | | | |
|---|---|---|---|
| 2001/0017934 A1 | 8/2001 | Paloniemi et al. ............ 382/107 |
| 2001/0026636 A1 | 10/2001 | Mainguet |
| 2001/0032319 A1 | 10/2001 | Setlak |
| 2001/0043728 A1 | 11/2001 | Kramer et al. |
| 2002/0054695 A1 | 5/2002 | Bjorn et al. ................. 382/124 |
| 2002/0109671 A1 | 8/2002 | Kawasome ................. 345/156 |
| 2002/0130673 A1 | 9/2002 | Pelrine et al. ............... 324/727 |
| 2002/0164057 A1 | 11/2002 | Kramer et al. |
| 2002/0186203 A1 | 12/2002 | Huang ........................ 345/157 |
| 2002/0188854 A1 | 12/2002 | Heaven et al. ............... 713/186 |
| 2003/0002718 A1* | 1/2003 | Hamid ........................ 382/124 |
| 2003/0016849 A1 | 1/2003 | Andrade ..................... 382/124 |
| 2003/0021451 A1* | 1/2003 | Lee ............................. 382/124 |
| 2003/0021495 A1 | 1/2003 | Cheng ........................ 382/312 |
| 2003/0025606 A1 | 2/2003 | Sabatini |
| 2003/0028811 A1 | 2/2003 | Walker et al. ............... 713/202 |
| 2003/0035568 A1 | 2/2003 | Mitev et al. ................. 382/124 |
| 2003/0035572 A1 | 2/2003 | Kalnitsky et al. |
| 2003/0044051 A1 | 3/2003 | Fujieda ....................... 382/124 |
| 2003/0095691 A1 | 5/2003 | Nobuhara et al. ........... 382/124 |
| 2003/0108227 A1 | 6/2003 | Philomin et al. |
| 2003/0115490 A1 | 6/2003 | Russo et al. ................. 713/202 |
| 2003/0123714 A1 | 7/2003 | O'Gorman et al. .......... 382/124 |
| 2003/0126448 A1 | 7/2003 | Russo ......................... 713/186 |
| 2003/0135764 A1 | 7/2003 | Lu .............................. 713/202 |
| 2003/0214481 A1 | 11/2003 | Xiong ......................... 345/157 |
| 2003/0215116 A1 | 11/2003 | Brandt et al. |
| 2004/0014457 A1 | 1/2004 | Stevens .................... 455/414.1 |
| 2004/0042642 A1* | 3/2004 | Bolle et al. .................. 382/115 |
| 2004/0128521 A1 | 7/2004 | Russo ......................... 713/186 |
| 2004/0148526 A1 | 7/2004 | Sands et al. ................. 713/202 |
| 2004/0156538 A1 | 8/2004 | Greschitz et al. ............ 382/124 |
| 2004/0186882 A1 | 9/2004 | Ting ........................... 709/202 |
| 2004/0208348 A1 | 10/2004 | Baharav et al. ............. 382/124 |
| 2004/0252867 A1 | 12/2004 | Lan et al. ..................... 382/124 |
| 2004/0258282 A1 | 12/2004 | Bjorn et al. .................. 382/124 |
| 2004/0263479 A1 | 12/2004 | Shkolnikov ................. 345/169 |
| 2005/0012714 A1 | 1/2005 | Russo et al. ................. 345/157 |
| 2005/0041885 A1 | 2/2005 | Russo ......................... 382/289 |
| 2005/0105782 A1* | 5/2005 | Abiko ......................... 382/124 |
| 2005/0144329 A1 | 6/2005 | Tsai et al. ...................... 710/1 |
| 2005/0169503 A1 | 8/2005 | Howell et al. ............... 382/115 |
| 2005/0179657 A1* | 8/2005 | Russo et al. ................. 345/163 |
| 2005/0259851 A1 | 11/2005 | Fyke ........................... 382/124 |
| 2005/0259852 A1 | 11/2005 | Russo ......................... 382/124 |
| 2006/0002597 A1 | 1/2006 | Rowe .......................... 382/124 |
| 2006/0034043 A1 | 2/2006 | Hisano et al. ............... 361/681 |
| 2006/0078174 A1 | 4/2006 | Russo ......................... 382/121 |
| 2006/0103633 A1 | 5/2006 | Gioeli ......................... 345/173 |
| 2006/0242268 A1 | 10/2006 | Omernick et al. ........... 709/219 |
| 2006/0280346 A1 | 12/2006 | Machida ..................... 382/124 |
| 2007/0014443 A1 | 1/2007 | Russo ......................... 382/124 |
| 2007/0016779 A1 | 1/2007 | Lyle ............................ 713/169 |
| 2007/0034783 A1 | 2/2007 | Eliasson et al. ............. 250/221 |
| 2007/0038867 A1 | 2/2007 | Verbauwhede et al. ...... 713/186 |
| 2007/0061126 A1 | 3/2007 | Russo et al. ................... 703/24 |
| 2007/0067642 A1 | 3/2007 | Singhal ....................... 713/186 |
| 2007/0125937 A1 | 6/2007 | Eliasson et al. ............. 250/221 |
| 2007/0146349 A1 | 6/2007 | Errico et al. ................. 345/174 |
| 2007/0274575 A1 | 11/2007 | Russo ......................... 382/124 |
| 2008/0013808 A1 | 1/2008 | Russo et al. ................. 382/125 |

FOREIGN PATENT DOCUMENTS

| | | |
|---|---|---|
| EP | 0973123 A | 1/2000 |
| EP | 1 113 383 A2 | 7/2001 |
| EP | 1 113 405 A2 | 7/2001 |
| EP | 1 143 374 B1 | 2/2005 |
| JP | 2000-048208 | 2/2000 |
| JP | 2000-056877 A | 2/2000 |
| JP | 09071135 | 3/2007 |
| WO | WO 98/15225 | 4/1998 |
| WO | WO 98/52145 | 11/1998 |
| WO | WO 98/52146 | 11/1998 |
| WO | WO 98/52147 | 11/1998 |
| WO | WO 98/52157 | 11/1998 |
| WO | WO 99/43258 | 9/1999 |
| WO | WO 00/68873 | 11/2000 |
| WO | WO 00/68874 | 11/2000 |
| WO | WO 00/72507 A1 | 11/2000 |
| WO | WO 01/09819 A1 | 2/2001 |
| WO | WO 01/09936 A1 | 2/2001 |
| WO | WO 01/29731 A1 | 4/2001 |
| WO | WO 01/39134 A3 | 5/2001 |
| WO | WO 01/65470 A1 | 9/2001 |
| WO | WO 01/73678 A1 | 10/2001 |
| WO | WO 01/77994 A1 | 10/2001 |
| WO | WO 01/80166 A3 | 10/2001 |
| WO | WO 01/94892 A3 | 12/2001 |
| WO | WO 01/94902 A2 | 12/2001 |
| WO | WO 01/94966 A2 | 12/2001 |
| WO | WO 01/95305 A1 | 12/2001 |
| WO | WO 01/99035 A2 | 12/2001 |
| WO | WO 01/99036 A2 | 12/2001 |
| WO | WO 02/15209 A3 | 2/2002 |
| WO | WO 02/15267 A2 | 2/2002 |
| WO | WO 02/44998 A1 | 6/2002 |
| WO | WO 02/069386 A1 | 9/2002 |
| WO | WO 02/071313 A1 | 9/2002 |
| WO | WO 02/073375 A2 | 9/2002 |
| WO | WO 02/086800 A1 | 10/2002 |
| WO | WO 02/093462 A1 | 11/2002 |
| WO | WO 02/095349 A1 | 11/2002 |
| WO | WO 03/007127 A2 | 1/2003 |
| WO | WO 03/017211 A2 | 2/2003 |
| WO | WO 03/049011 A1 | 6/2003 |
| WO | WO 03/049012 A2 | 6/2003 |
| WO | WO 03/049016 A2 | 6/2003 |
| WO | WO 03/049104 A1 | 6/2003 |
| WO | WO 03/075210 A2 | 9/2003 |

OTHER PUBLICATIONS

"EBN Biometrics", By Andrew Conry-Murray, 5 pages, posted Jul. 7, 2002, as printed Aug. 23, 2004, at http://www.networkmagazine.com/shared/printablearticle.jhtml?articleID-17601104.

Ballard and Brown, "Computer Vision", Prentice Hall, 1982, pp. 66-69.

S. Shigematsu et al., "A Single-Chip Fingerprint Sensor and Identifier", IEEE Journal of Solid-State Circuits, vol. 34, No. 12, Dec. 1999, pp. 1852-1859.

"Fingernail Touch Sensors: Spatially Distributed Measurement and Hemodynamic Modeling", Stephen Mascaro and H. Harry Asada, 2000 IEEE, pp. 3422-3427.

Choonwoo Ryu et al. "Super-template Generation Using Successive Bayesian Estimation for Fingerprint Enrollment", 2005 Springer-Verlag Berlin Heidelberg, pp. 710-719.

Dongjae Lee et al. "Fingerprint Fusion Based on Minutiae and Ridge for Enrollment", 2003 Springer-Verlag Berlin Heidelberg, pp. 478-485.

Koichi Sasakawa et al. "Personal Verification System with High Tolerance of Poor Quality Fingerprints", 1990 Machine Vision Systems Integration in Industry, pp. 265272.

Michal Irani et al. "Improving Resolution by Image Registration", 1991 by Academic Press, Inc., pp. 231-239.

Qinfen Zheng et al. "A Computational Vision Approach to Image Registration", 1992 IEEE, pp. 193-197.

Wei-Yun Yau et al. "Fingerprint Templates Combination", 2004 Springer-Verlag Berlin Heidelberg, pp. 449-460.

Xudong Jiand et al. "Detecting the Fingerprint Minutiae by Adaptive Tracing the Gray-Level Ridge", 2001, pp. 999-1013, Published by Elsevier Science Ltd.

Xudong Jiang et al. "Fingerprint Minutiae Matching Based on the Local and Global Structures", 2000 Ieee, pp. 1038-1041.

Jacob O. Wobbrock, Brad A. Myers, Htet Htet Aung, and Edmond F. LoPresti, Text Entry from Power Wheelchairs: EdgeWrite for Joysticks and Touchpads, pp. 110-117, Human-Computer Interaction Institute School of Computer Science Carnegie Mellon University, Pittsburg, PA 15213 USA.

Bartholomew J. Kane "A High Resolution Traction Stress Sensor Array For Use In Robotic Tactile Determination", A Dissertation Submitted to the Department of Mechanical Engineering and the Committee on Graduate Studies of Stanford University in Partial Fulfillment of the Requirements for the Degree of Doctor of Philosophy, Sep. 1999.

Xudong Jiang et al., "Fingerprint Minutiae Matching Based on the Local and Global Structures," Sep. 2000, pp. 1038-1041, IEEE.

Kyung Deok Yu et al., "A Fingerprint Matching Algorithm based on Radial Structure and a Structure-Rewarding Scoring Strategy," Jun. 2005, pp. 656-664, AVBPA, LNCS, Audio- and Video-Based Biometric Person Authentication, Springer-Verlag Berlin Heidelberg.

* cited by examiner

US 7,587,072 B2

SYSTEM FOR AND METHOD OF GENERATING ROTATIONAL INPUTS

RELATED APPLICATION

This application claims priority under 35 U.S.C. § 119(e) of the U.S. provisional application Ser. No. 60/497,045, filed on Aug. 22, 2003, and titled "ROTATIONAL INPUT METHOD PATENT." The provisional application Ser. No. 60/497,045, filed on Aug. 22, 2003, and titled "ROTATIONAL INPUT METHOD PATENT" is hereby incorporated by reference.

FIELD OF THE INVENTION

This invention relates to the field of biometric sensors. In particular, this invention relates to systems and methods that use fingerprint images to emulate electronic positioning devices.

BACKGROUND OF THE INVENTION

The emergence of portable electronic computing platforms allows functions and services to be enjoyed wherever necessary. Palmtop computers, personal digital assistants, mobile phones, portable game consoles, biometric/health monitors, remote controls, digital cameras, to name a few, are some daily-life examples of portable electronic computing platforms. The desire for portability has driven these computing platforms to become smaller and, consequently, to have longer battery life. A dilemma occurs when these ever-smaller devices require efficient ways to collect user input.

Portable electronic computing platforms need these user inputs for multiple purposes, including (a) navigating a cursor or a pointer to a certain location on a display, (b) selecting (e.g., choosing or not choosing) an item or an action, and (c) orientating (e.g., changing direction with or without visual feedback) an input device.

Concepts for user input from much larger personal computers have been borrowed. Micro joysticks, navigation bars, scroll wheels, touch pads, steering wheels and buttons have all been adopted, with limited success, in conventional devices. All these positioning devices consume substantial amounts of valuable surface real estate on a portable device. Mechanical positioning devices such as joysticks, navigation bars and scroll wheels can wear out and become unreliable. Their sizes and required movements often preclude optimal ergonomic placement on portable computing platforms.

Prior art methods calculate rotation by rotating one frame with respect to another and then applying standard correlation methods. These methods require the selection of a pivot point (e.g., the origin), followed by additional computations. These computations are not helpful for determining linear motion (e.g., non-rotational movement in the x- and y-directions). Such a shortcoming makes prior art systems even more inefficient when used in portable devices, in which both rotational and linear movement are required, such as when emulating, respectively, a steering wheel and a pointing device.

SUMMARY OF THE INVENTION

The present invention discloses a system for and method of obtaining rotation information from a patterned image, such as a fingerprint image. Embodiments of the present invention thus require smaller footprints than those that use joy sticks, steering wheels, and other, larger devices that require additional power. Embodiments of the present invention use linear correlation methods that are easier to use than rotational and other methods such as those using trigonometric functions. Embodiments of the present invention thus use simpler algorithms that can be performed faster and more reliably.

In a first aspect of the present invention, a method of obtaining rotation information comprises capturing a plurality of patterned images from a plurality of locations, correlating the plurality of patterned images to generate sets of linear differences, and using the sets of linear differences to generate the rotation information. The plurality of locations comprise a first part of a sensor and a second part of the sensor. A first of the plurality of patterned images is captured in the first part of the sensor and a second of the plurality of patterned images is captured in the second part of the sensor.

Preferably, the sensor is a biometric image sensor, such as a finger image sensor. The first of the plurality of patterned images and the second of the plurality of patterned images together correspond to a fingerprint image in a first position on the sensor. A third of the plurality of patterned images is captured in the first part of the sensor and a fourth of the plurality of patterned images is captured in the second part of the sensor. The third of the plurality of patterned images and the fourth of the plurality of patterned images together correspond to the fingerprint image in a second position on the sensor. In one embodiment, the rotation information corresponds to an angular difference between the first position and the second position.

In one embodiment, correlating the plurality of patterned images comprises correlating the first patterned image with the third patterned image to generate a first set of linear differences from the sets of linear differences, correlating the second patterned image with the fourth patterned image to generate a second set of linear differences from the sets of linear differences, and correlating a first combination of the first patterned image and the second patterned image with a second combination of the third patterned image and the fourth patterned image to generate a third set of linear differences from the sets of linear differences. Correlating the first patterned image with the third patterned image, correlating the second patterned image with the fourth patterned image, and correlating the first combination with the second combination all comprise performing a cross correlation. In one embodiment, the cross correlation is either a normalized cross correlation or a standardized cross correlation.

In one embodiment, the first part of the sensor and the second part of the sensor are contiguous. Alternatively, the first part of the sensor and the second part of the sensor are not contiguous.

In one embodiment, the first part of the sensor comprises a first sub-frame of pixels and the second part of the sensor comprises a second sub-frame of pixels. In this embodiment, capturing the first patterned image comprises storing in the first sub-frame first data corresponding to the first patterned image, capturing the second patterned image comprises storing in the second sub-frame second data corresponding to the second patterned image, capturing the third patterned image comprises storing in the first sub-frame third data corresponding to the third patterned image, and capturing the fourth patterned image comprises storing in the second sub-frame fourth data corresponding to the fourth patterned image. Correlating the first patterned image with the third patterned image comprises correlating the first data with the third data to generate first and second linear differences from the first set of linear differences. Correlating the second patterned image with the fourth patterned image comprises correlating the second data with the fourth data to generate first and second linear differences from the second set of linear differences.

And correlating the first combination with the second combination comprises correlating a combination of the first data and the second data with a combination of the third data and the fourth data to generate first and second linear differences from the third set of linear differences.

In another embodiment, correlating comprises determining a lag to correlate elements of one of the first and second sub-frames, the lag and a difference between the elements corresponding to first and second linear differences from one of the sets of linear differences. Each element corresponds to a row of one of the first and second sub-frames. Alternatively, each element corresponds to a column of one of the first and second sub-frames.

In another embodiment, the method further comprises filtering the first set of linear differences, the second set of linear differences, the third set of linear differences, and the rotation information. Filtering comprises multiplying by a scaling factor, performing a smoothing function, and performing a clipping function.

Preferably, the finger image sensor is a finger swipe sensor. Alternatively, the finger image sensor is a finger placement sensor.

In another embodiment, the method further comprises using the rotation information on a host platform having a display screen, the rotation information used to rotate an object on the display screen, thereby emulating a computer input device. The computer input device is selected from the group consisting of a steering wheel, a joystick, and a navigation bar. Emulating a computer input device comprises moving the object on the display screen at a rate related to the angular difference or the angular position.

In accordance with a second aspect of the invention, a system for obtaining rotation information comprises means for capturing a plurality of patterned images from a plurality of locations and means for correlating the plurality of patterned images to generate sets of linear differences and for using the sets of linear differences to generate the rotation information.

In accordance with a third aspect of the present invention, a method of emulating a rotational device using a pattern comprises capturing a first image of the pattern at a first orientation, capturing a second image of the pattern at a second orientation, correlating the first image with the second image to calculate linear differences between the first orientation and the second orientation, translating the linear difference into rotational data, and using the rotational data to emulate the movement of a rotational device.

In accordance with a fourth aspect of the present invention, a system for emulating a positional device comprises a sensor for capturing an image of a pattern and a processor coupled to the sensor. The processor is configured to calculate linear differences between a first position of the image of the pattern and a second position of the image of the pattern and to translate the linear differences into rotational data corresponding to a rotation of the image of the pattern.

In accordance with a fifth aspect of the present invention, a method of sensing rotation of an object on an image sensor comprises sensing a first image of the object, sensing a second image of the object, and comparing the first image with the second image to determine whether there is linear motion in each of at least two portions of an area containing the first image and the second image to determine whether the object remained stationary, moved in a linear manner, or rotated.

DETAILED DESCRIPTION OF THE INVENTION

Figure 1A:
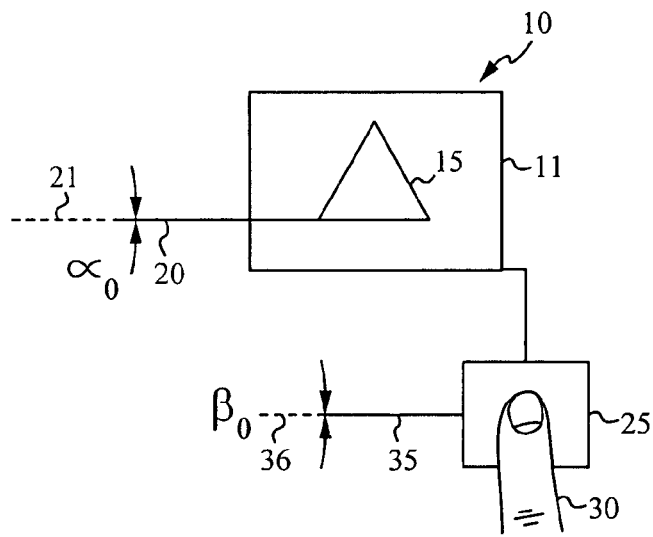
FIGS. 1A and 1B show how an electronic image is rotated by rotating a finger on a finger image sensor, in accordance with the present invention.

The present invention is directed to systems for and methods of determining the rotational position and movement of an arbitrary patterned material imaged by an imaging sensor. Preferably, the arbitrary patterned material is a finger and the rotational position and movement of the image of the finger are determined.

Embodiments of the present invention advantageously determine and collect finger rotational information for use in a digital device and most preferably in personal computing devices. Unlike prior art rotational position correlators, which are non-linear, requiring trigonometric functions like sine, cosine, and tangent calculations, embodiments of the present invention use a linear correlation method that is easier to implement and more computationally efficient. Embodiments of the present invention allow for extremely efficient calculation of linear motion from the components used to determine the rotational motion, thereby reducing the complexity of systems that require one sensor to be used to gather both linear and rotational movement inputs.

A system in accordance with embodiments of the present invention reconstructs fingerprint images from swipe sensors, thereby efficiently providing rotational motion data along with data necessary to reconstruct the image. The system is particularly well suited for applications that do not require high precision rotational information. Methods of and systems for fingerprint sensing are described in detail in the U.S. patent application Ser. No. 10/194,994, filed Jul. 12, 2002, and titled "Method and System for Biometric Image Assembly from Multiple Partial Biometric Frame Scans," and in the U.S. patent application Ser. No. 10/099,558, filed Mar. 13, 2002, and titled "Fingerprint Biometric Capture Device and Method with Integrated On-Chip Data Buffering," both of which are hereby incorporated by reference in their entireties. In the preferred embodiment, the fingerprint sensor is an Atrua Wings ATW 100 capacitive swipe sensor by Atrua Technologies, Inc., at 1696 Dell Avenue, Campbell, California 95008.

A key aspect of the present invention is determining rotation from linear correlation rather than prior art methods that determine rotation by rotating one frame with respect to another, and then applying standard correlation methods. The prior art methods require choosing a pivot point (center of origin) and then performing additional computation. Furthermore, such computation is not helpful for determining linear motion (non-rotational movement in the x- and y-directions). These computations are even more inefficient in portable electronic devices where it may be important to calculate both kinds of movement, for instance, when emulating a pointing device and a steering wheel on one component.

Most of the prior art is concentrated on calculating exact rotational movement, and therefore requires the more precise steps outlined above. However, many applications do not require such precision, and it is these cases where the new invention is bes suited. Embodiments of the present invention make use of the fact that, as a finger rotates clockwise, the left side of the image of the finger will appear to be moving upward, while the right half of the image will appear to be moving downward. This is sometimes referred to as shear. The opposite is true of counterclockwise motion. Furthermore, in both cases, the left side will appear to be moving toward the right, and the right side will appear to be moving toward the left, as shown in FIGS. 3B and 3C. On a typical swipe type of finger imaging sensor, which is mounted horizontally so that it its height is much smaller than its width, the upward and downward motion is easily observed and exploitable, but because the sensor is so small in height, observing the motion in the x-direction is more difficult. If a swipe sensor is mounted vertically, then it will be easier to observe motion in the x-direction than in the y-direction due to the device's small width in this case. The invention is equally applicable to both cases. It is also equally applicable on a large fingerprint placement sensor, where movement in both the x- and y directions is easily observable and can be exploited.

Figure 3A:
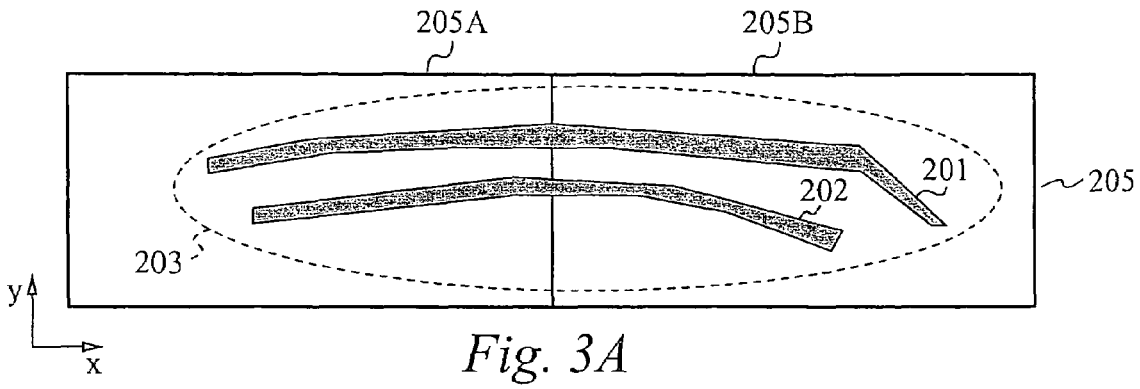
FIGS. 3A-D shows left- and right-hand sections of a fingerprint sensor with a portion of a fingerprint image placed upon it as the fingerprint image is linearly moved and rotated in accordance with the present invention.
Figure 3B:
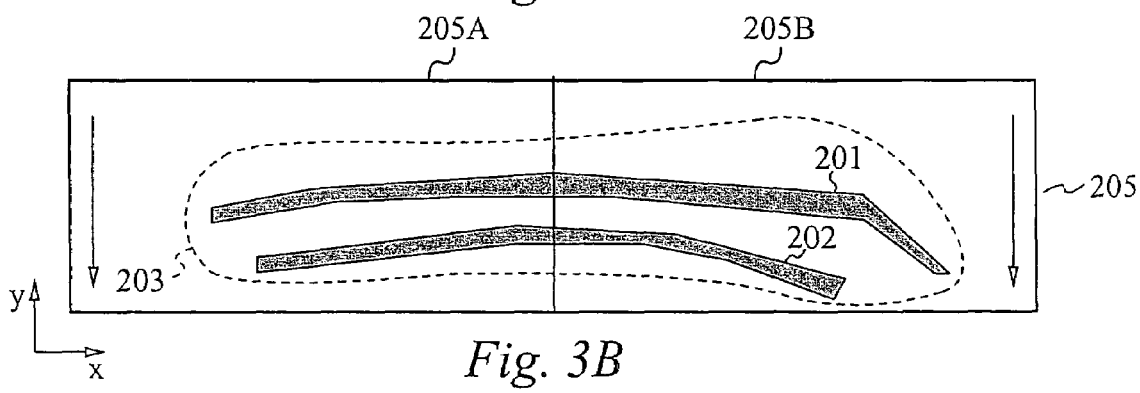
Figure 3C:
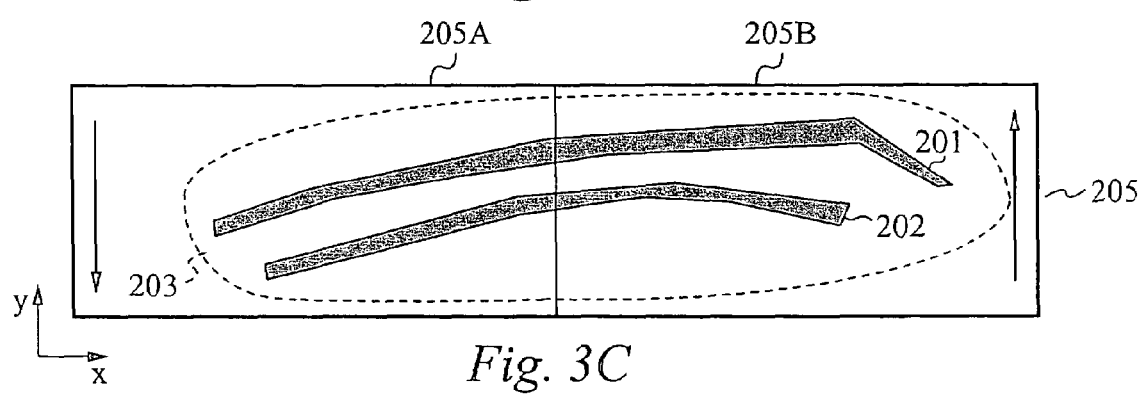
Figure 3D:
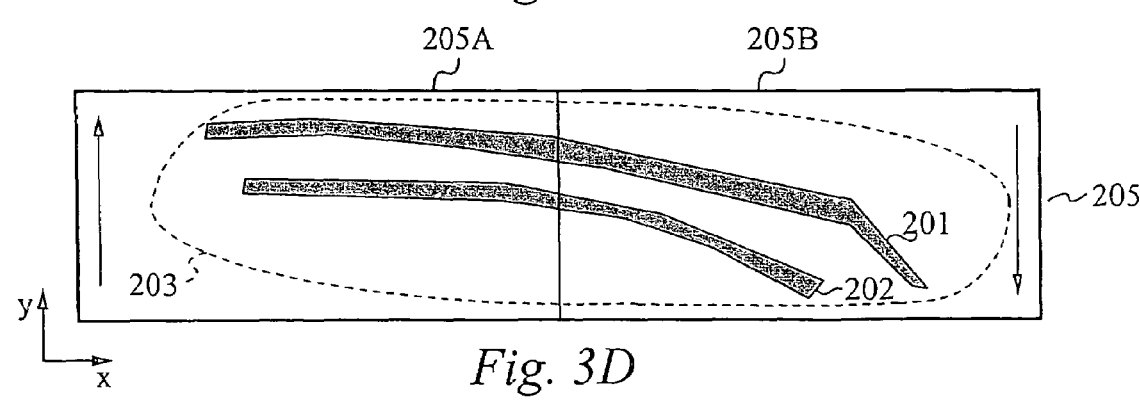

Using the observations outlined above, embodiments of the present invention use the simpler linear correlation methods to determine rotational movement, which will occur when motion of the left side of a finger image is in an opposite direction to that of the right side For instance, if the left half is moving upward and the right half downward, there is clockwise rotational movement as shown in FIG. 3D, discussed below. If the linear movement detected at the left edge and right edge of the sensor are substantially equal but opposite, the center of rotation is at or near the center of the sensor. If the linear movement is not equal but opposite, the center of rotation can be calculated and will be closer to the end of the sensor with the smaller amount of linear movement. If the linear movement is not equal but opposite, the center of rotation can be calculated. If both sides are moving in the same direction, as in FIG 3B, then likely only overall linear movement is observed. It will be appreciated that the present invention can determine and angle of rotation even if the center of rotation is displaced, as when a finger slides along the sensor as it rotates.

Accordingly, the present invention offers a reliable and computationally-efficient solution to obtain high-resolution rotational information about a user's finger as it contacts a finger imaging sensor, so that such a sensor can, for example, emulate a steering wheel for use in gaming, or rotate the image of a map for easier viewing on a display.

Figure 1B:
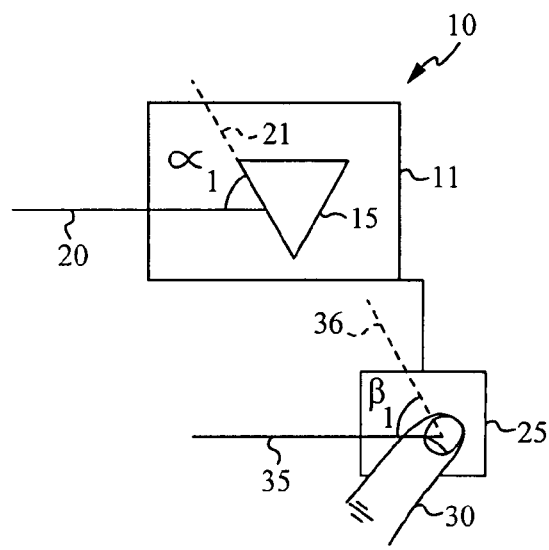

FIG. 1A shows a system 10 used to illustrate one embodiment of the present invention. The system 10 comprises a finger image sensor 25 coupled to a display device 11, displaying a triangular electronic image 15. The display device 11 can be a monitor used with a personal computer, a screen on a personal digital assistant (PDA) or game device, or any other kind of display device. FIG. 1A also shows a finger 30 placed on the finger image sensor 25. It will be appreciated that the finger 30 has patterns on a surface contacting the finger image sensor 25 and that the finger image sensor 25 captures images of those patterns. A coordinate axis 20 makes angle $\alpha_0$ with and edge 21 of the triangular image 15. A coordinate axis 35 makes an angle $\beta_0$ with a line segment 36 associated with the finger 30. FIG. 1B shows the system 10 after the finger 30 has been rotated so that the coordinate axis 35 makes an angle $\beta_1$ with the line segment 36. In accordance with the present invention, the triangular image 15 is rotated so that the coordinate axis 20 makes an angle $\alpha_1$ with the edge 21. Thus, in accordance with one embodiment, rotating the finger 30 through an angle $\beta_1$-$\beta_0$ ($\Delta\beta$) results in rotating the triangular electronic image through an angle $\alpha_1$-$\alpha_0$ ($\Delta\alpha$).

It will be appreciated that $\Delta\alpha$ can correspond to $\Delta\beta$ in any number of ways. For example, $\Delta\alpha$ can equal $\Delta\beta$, $\Delta\alpha$ can be a multiple of $\Delta\beta$, $\Delta\alpha$ can be a fraction of $\Delta\beta$, $\Delta\alpha$ can be a multiple of $\Delta\beta$ plus some offset, etc. It will also be appreciated that in accordance with one embodiment, the finger 30 does not have to maintain a pivot point on the finger image sensor 25. The finger 30 can be moved horizontally or vertically on the finger image sensor 25 before, while, or after it is rotated so that the line segment 36 is displaced horizontally, or vertically, or both, and the angle $\Delta\beta$ still determined. It will also be appreciated that vertical and horizontal movements of the finger 30 can also captured to vertically and horizontally displace the triangular image 15 on the display device 11. It will also be appreciated that the triangular image 15 can be moved at a rate related to $\Delta\beta$ (called the rate mode) or at a rate related to $\beta_1$.

While the finger image sensor 25 is depicted as a placement sensor, it will be appreciated that other types of sensors can be used in accordance with the present invention. Preferably, the finger image sensor 25 is a swipe sensor, described in more detail below.

Figure 1C:
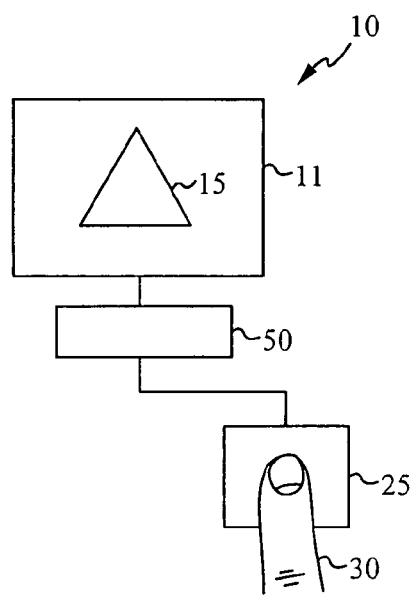
FIGS. 1C shows a finger image sensor, processor, and display device in accordance with one embodiment of the present invention.

FIG. 1C shows one embodiment of the present invention that includes a processor 50 coupling the finger image sensor 25 to the display device 11. The processor 50 is configured to correlate multiple patterns of an image of the finger 30 captured on the finger image sensor 25, to thereby determine linear differences between the multiple patterns. As described in more detail below, the linear differences are used to determine, among other things, a rotation of the finger on the finger image sensor 25, to thereby control objects displayed on the display device 11, such as described above.

Figure 2:
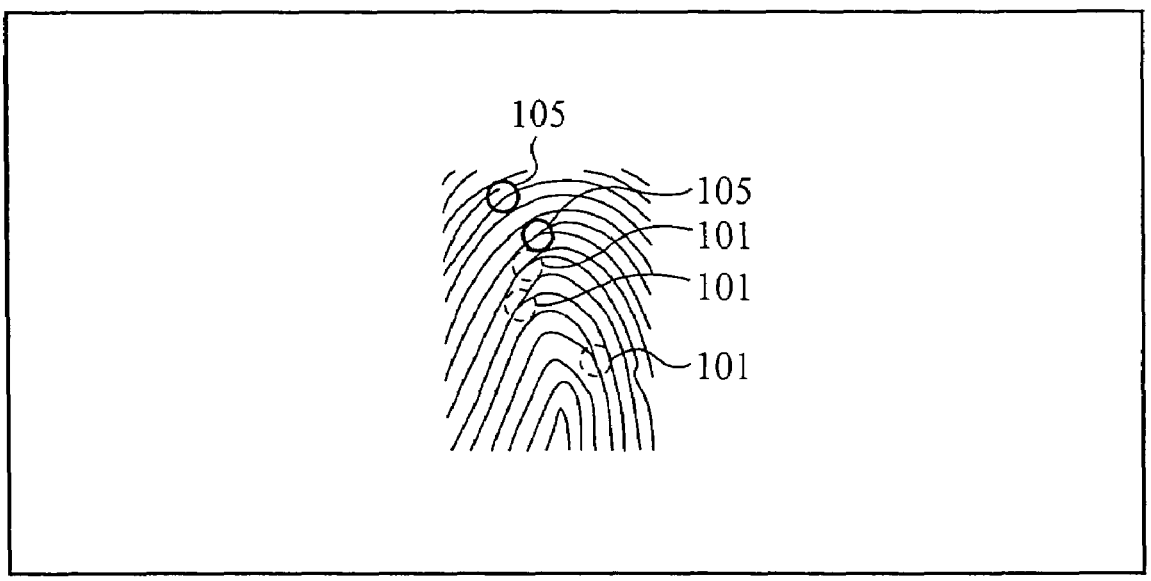
FIG. 2 shows a fingerprint image where ridges are shown in black and valleys are shown in white and indicating areas of bifurcation and ridge endings.

FIG. 2 shows a typical fingerprint image, including physical ridges and valleys on the surface of the finger. The pattern of ridges and valleys has proven to be unique among very large populations of human beings, especially the ridge endings and bifurcations called "minutiae." Fingers also often have other measurable surface features such as pores, scars, and wrinkles. It is the overall pattern of features—not the unique individual features—that are tracked to measure the distance, rotation, direction, or speed that a fingerprint has moved on the finger image sensor.

Many prior art electronic finger imaging sensors actively sense the entire surface of a fingerprint at the same time. Whether based on optical or electrical sensing methods, these sensors have a surface area at least as large as a typical person's fingertip pad (typically 15 mm×15 mm). Using these sensors the user simply places his finger on the sensor until the image is captured. These sensors, now known as placement sensors, contain rows and columns and can capture large images, typically ranging from 250-500 rows and 200-500 columns depending on the sensor's capabilities and size. Such devices are capable of sensing rotational input, and can indeed be used with the new invention to collect rotational information, but they are larger than today's more miniaturized finger sensors.

The most promising of the miniaturized sensors is one that is fully sized in one direction (typically in width) but abbreviated in the other (typically height). This results in a sensor that only is capable of sensing a small rectangular portion of the fingerprint at any one time.

Such smaller sensors are better suited for use with the present invention, not only because they are more apropos for portable devices, but also because they produce smaller images. The smaller images have less data in them, making the computations less intense. While it is possible to ignore or mask off data from a larger sensor to make it resemble a smaller one, such an approach is not ideal, because it does not guarantee that the finger of the user is even touching the area of interest. With a swipe sensor, this is not an issue.

Embodiments of the present invention can acquire rotational position data from any device capable of imaging the surface of a human finger or other patterned material and is therefore not limited to use with placement or swipe finger image sensors, which typically provide at least 250 dots per inch resolution. The present invention will also work with lower or higher resolution devices that may become available in the future.

FIG. 3A shows the left half 205A and the right half 205B of a finger image sensor 205. The finger image sensor 205 has placed upon it a finger identified by the fingerprint image 203 having identifiable ridge portions 201 and 202. FIG. 3A also shows an x-coordinate axis and a y-coordinate axis, with the arrow of each axis pointing in a direction of increasing values for the respective axis. FIG. 3A shows the fingerprint image 203 in a first orientation on the finger image sensor 205 and thus in a first orientation with respect to the x-coordinate axis and the y-coordinate axis. FIG. 3B shows the fingerprint image after it has been moved linearly in a vertical position, in a direction of decreasing values for the y-coordinate. FIG. 3C shows the fingerprint image 203 after it has been rotated counter-clockwise on the finger image sensor 205. It is seen by comparing the orientations of the fingerprint image 203 from FIG. 3B to FIG. 3C that the y-coordinates of the identifiable portions 201 and 202 in the left half 205A have both decreased and that the y-coordinates in the right half 205B have both increased. FIG. 3D shows the fingerprint image 203 after it has been rotated clockwise on the finger image sensor 205. It is seen by comparing the orientations of the fingerprint image 203 from FIG. 3C to FIG. 3D that the y-coordinates of the identifiable portions 201 and 202 in the left half 205A have both increased and that the y-coordinates in the right half 205B have both decreased.

Figure 4:
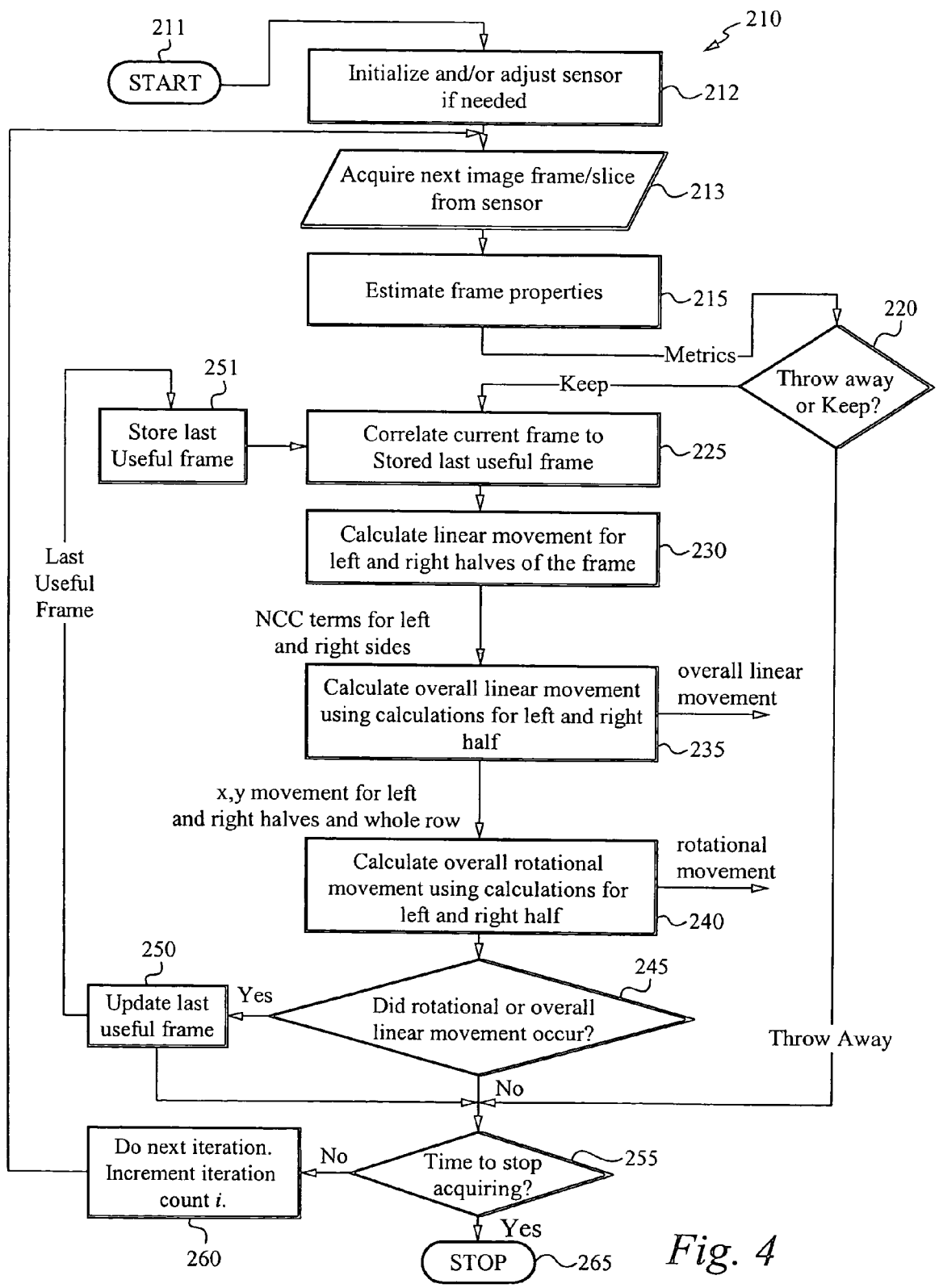
FIG. 4 is a flowchart of a frame acquisition and image correlation procedure in accordance with the present invention.

FIG. 4 is a flowchart for an algorithm 210 for determining rotational movement or placement in accordance with a preferred embodiment of the present invention. In the start step 211, a user is prompted by an operating system or application executing on a host (not shown). Next, in the step 212, a finger image sensor (not shown) in accordance with the present invention is initialized, readied for reading data. This step 212 comprises powering on the sensor and making sure it is ready to capture a fingerprint image. Step 212 can also include setting contrast and brightness levels, setting the sensor to a desired data acquisition mode, calibrating the sensor, or otherwise initializing the sensor. It will be appreciated that step 212 is not required if the sensor has already been initialized.

Next, in the step 213, a frame is read by the sensor at a rate supported by it or by the hardware platform's computing power and bandwidth. In the step 215, the properties of the frame are estimated to determine whether it is useful. The metrics of the frame are analyzed in the step 220, to determine whether the frame is useful. If the frame is useful, it is kept and processing continues in the step 225; otherwise, the frame is disregarded, and processing continues in the step 255. As described in more detail below, in a preferred embodiment the usefulness of a frame is determined by measuring image statistics such as the average value and the variance of pixel data in the frame. The usefulness of a frame is directly related to whether or not a finger is present on the sensor. It will be appreciated that the step 215 can be eliminated if a less efficient implementation is acceptable, or when the sensor only generates frames when a finger is present on it.

In the step 225, the current frame (e.g., the frame most recently read and currently being processed) is correlated with the last stored useful frame. On the very first iteration, since there is no "last useful frame," the current frame is copied to the last useful frame. In a preferred embodiment, the frame is divided into a left half and a right half. It will be appreciated, however, that a frame can be divided into any number of parts. Next, in the step 230, the linear movement of the left half of the frame and the linear movement of the right half of the frame are both calculated. In the step 235, using the linear movement of the left half of the frame and the linear movement of the right half of the frame, the overall linear movement of the frame is calculated. This calculation is described in more detail below. In the step 240, the calculations made in the step 235 are used to calculate the rotational movement of the fingerprint image.

Next, in the step 245 the process checks whether there was any movement, linear or rotational, of the fingerprint image. If there was movement, the process continues in the step 250, otherwise it continues in the step 255. In the step 250, the last frame useful frame is updated, and in the step 251, the last useful frame is stored. Processing then continues in the step 225.

In the step 255, the process checks whether more frames are to be acquired. If more frames are to be acquired, the process continues to the step 260, where a counter is incremented, and then continues on to the step 213. If no more frames are to be acquired, the process continues to the step 265, where it stops.

As described above, the pixels for the current frame are correlated to the pixels of the last useful frame to determine the amount of rotational or linear motion. If overall linear movement has been calculated in the step 235, data corresponding to the movement are sent to whatever downstream process needs it. For example, a program (e.g., an application program, a device driver, or an operating system) can use the corresponding data to linearly position a pointer on a display screen. If any overall rotational movement has been calculated in the step 240, data corresponding to the movement are sent to whatever downstream process needs it. For example, a program can use the corresponding data to rotate an image on the display screen. Once it is determined that movement has occurred, the last useful frame is replaced by the current frame and the algorithm continues by acquiring new image data from the sensor.

In a preferred embodiment, the system iterates in real time. Alternatively, the system stores all the frames in a memory buffer and calculates movement after multiple frames are acquired from the sensor. Preferably, the iteration halts when either the application or operating system tells it to stop. When the system is used as a pointing device for an operating system, the process can continue indefinitely.

The algorithm starts whenever there is a need for rotational feedback, such as power up of a device or start of a game. The algorithm terminates when rotational information is no longer needed.

Figure 5A:
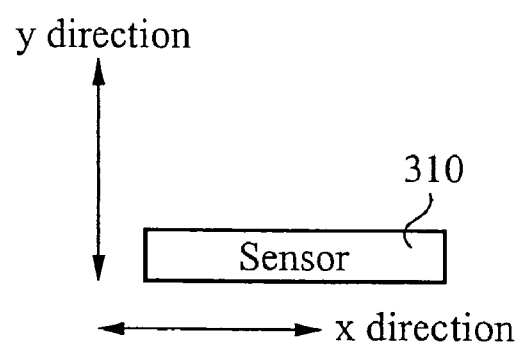
FIG. 5A shows a finger image sensor in a horizontal orientation.
Figure 5B:
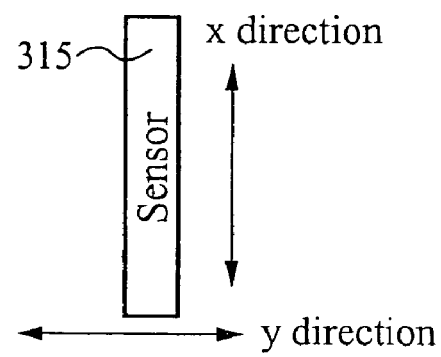
FIG. 5B shows a finger image sensor in a vertical orientation.
Figure 6:
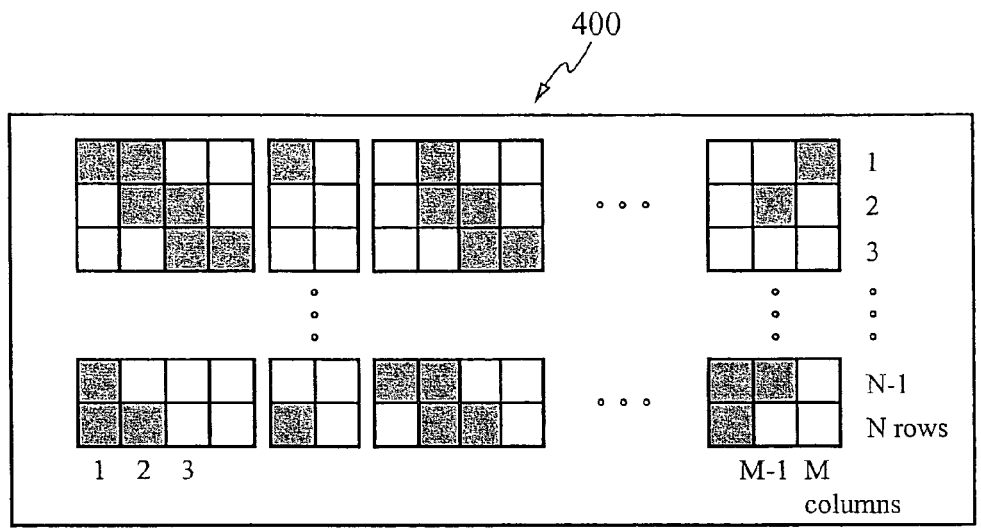
FIG. 6 shows pixel data from a frame (slice) from a fingerprint sensor.

In a preferred embodiment, the system executes on a computing device that is connected to a swipe fingerprint sensor 310 shown in FIG. 5A. The swipe sensor 310 is mounted horizontally with respect to the x and y directions so that image frames as shown in FIG. 6 are captured. The x direction is along the longest side of the sensor 310 while the y direction is perpendicular to the x direction. It will be appreciated that the sensor 310 can be mounted in any orientation. For consistency, the length of the sensor along the x-axis will always denote the length of the sensor. FIG. 5B shows a sensor 315 having a second orientation used in accordance with the present invention. The sensor 315 is mounted vertically with respect to the x and y directions. In the preferred embodiment, the fingerprint sensor (e.g., 310 or 315) provides a single frame of data to a program upon request. As described below, a single frame can be logically divided into any number of smaller sub-frames. Sensors that can provide more than one frame per request can also be used in accordance with the present invention. It will also be appreciated that fingerprint sensors in accordance with the present invention can be mounted at orientations other than those shown in FIGS. 5A and 5B.

Typically, swipe sensors are capable of delivering anywhere from 250 to 3000 frames per second (the "frame rate"), depending on the sensor's capabilities, the interface used and the speed of the host personal computer.

FIG. 6 shows image data 400 captured by a finger image sensor in accordance with the present invention. The image data 400 comprises N rows by M columns of picture elements, or pixels, with each pixel typically represented by a single byte (8 bits) of data. M can be any positive value (100-300 is typical, depending on resolution) and N must be at least 2 (the typical number of rows in a frame is 8-32). Preferably, N=8 and M=192. A value of a pixel is a gray level, such that the image frame resembles a finger image when displayed on a computer monitor. Typically, this value ranges from 0 to 255, with 0 representing black and indicating the presence of a fingerprint ridge, and 255 representing white and indicating the presence of a valley. Other ranges of data and other representations of such data are possible without affecting the nature of the invention.

It is possible, in alternative embodiments, to use the system with little or no modification, with other similar types of sensors, such as optical document scanners. In one embodiment, the system of the present invention executes in specialized hardware or firmware instead of in software. In another embodiment, the algorithm executes on a general-purpose CPU and other portions execute solely in hardware.

Figure 7:
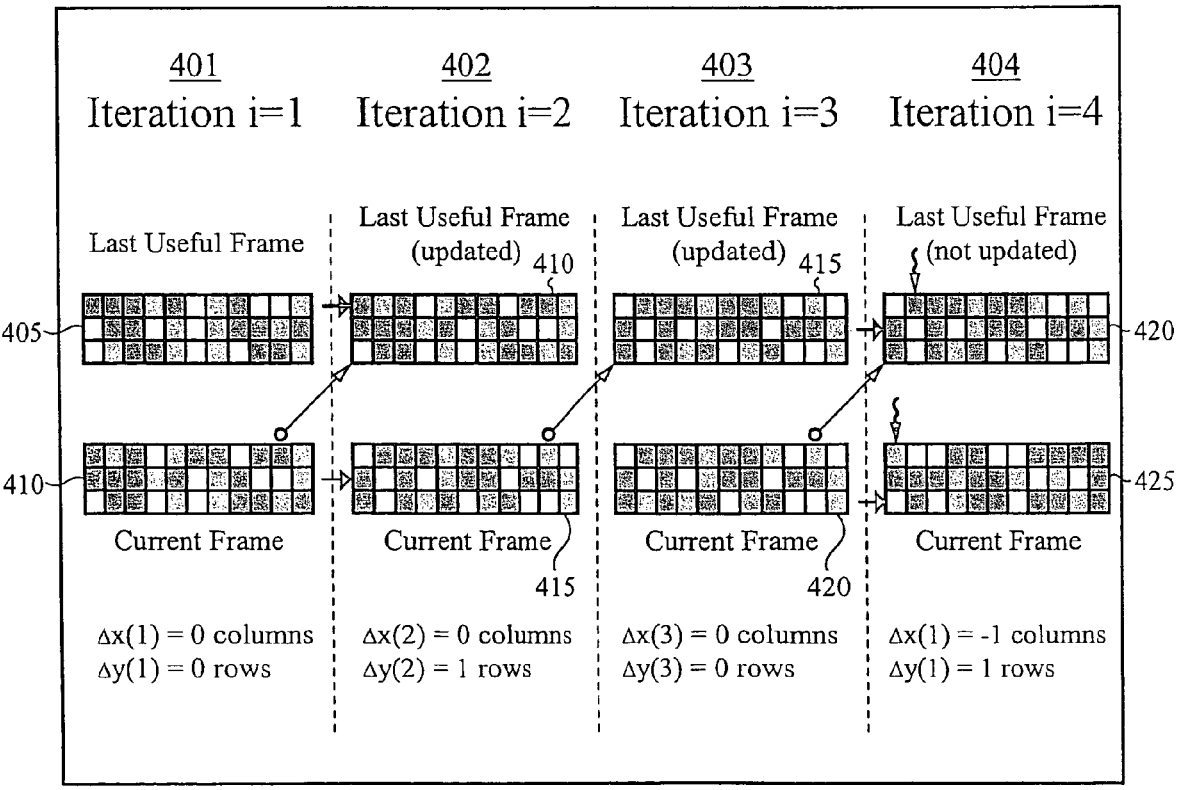
FIG. 7 shows pixel data from a fingerprint sensor during different iterations of reconstruction in accordance with the present invention.

FIG. 7 shows a current frame and the last useful frame for several iterations of the algorithm 210 in FIG. 3. Iteration 1, shown in column 401, shows a last useful frame 405 and a current frame 410. No rows of the frame 405 correspond to the frame 410, so no recognizable movement can be identified. Iteration 2, shown in column 402, shows a last useful frame 410 and a current frame 415. It will be appreciated that the last useful frame 410 corresponds to the current frame from the previous iteration, iteration 1. Row 0 of frame 410 (indicated by an arrow) corresponds to row 1 of frame 415 (also indicated by an arrow). Linear movement in a y direction is thus detected. Iteration 3, shown in column 403, shows a last useful frame 415 and a current frame 420. Frame 415 is identical to the frame 420, so zero motion is recognized. (E.g., the finger has not been moved on the finger image sensor.) In this example, the last useful frame does not have to be updated. Iteration 4, shown in column 404, shows a last useful frame 420 and a current frame 425. It will be appreciated that the last useful frame 420 corresponds to the current frame from iteration 3. Row 1 of frame 420 (indicated by a straight arrow) corresponds to row 2 of frame 425 (also indicated by a straight arrow). This vertical shift in rows (i.e., tracking images of fingerprint patterns as they and hence a finger moves from row 1 to row 2) indicates a downward movement of a finger on a finger image sensor, referred to as movement in a positive y direction. Furthermore, column 2 of frame 420 (indicated by a squiggly arrow) corresponds to column 1 of frame 425 (also indicated by a squiggly arrow). This horizontal shift in columns (i.e., tracking images of fingerprint patterns as they and hence a finger moves from column 2 to column 1) indicates a left movement of a finger on a finger image sensor, here labeled movement in a negative x-direction. In this example, because a positive y-movement and a negative x-movement has been detected, a clockwise rotation of the fingerprint image is recognized.

It will be appreciated that signs (positive or negative) assigned to a particular direction in an x-direction and a y-direction are arbitrarily chosen for the sake of explanation. The signs can be reversed.

The algorithm 210 in FIG. 4 is now described in more detail. As described above, the algorithm 210 iterates, requesting new frames of data (step 213) and correlating them to a previous image frame (step 225) stored in a buffer for just this purpose. At the $i^{th}$ iteration of the algorithm 210, one frame of data is requested from the sensing device (e.g., a finger image sensor). Once the frame is collected, it is analyzed to determine its usefulness. If the frame is deemed useful, it is saved in local memory for later use; if it is deemed useless, it is simply disregarded.

In the preferred embodiment, the usefulness of a frame is determined by ensuring the frame contains at least some finger image information. For instance, if a frame is collected when no finger is on the device, that frame likely will contain only noise or a blank image. This is done using rules based on measuring image statistics of the frame, namely the average value and the variance. Some sensors provide information on finger presence, and that can be used in systems where it is available, either by itself or in conjunction with the above statistics.

Mathematically, if the pixel in the $n^{th}$ row and $m^{th}$ column is given by frame[n,m], then:

$$FrameAverage = \Phi = \frac{\sum_{n=1}^{N}\sum_{m=1}^{M} \text{frame}[n,m]}{N \times M}$$

$$FrameVariance = \Psi = \frac{\sum_{n=1}^{N}\sum_{m=1}^{M} (\text{frame}[n,m] - \Phi)^2}{N \times M}$$

For the purposes of efficiency, the Metrics (calculated in the step 215) can also be calculated just using portions of the frame (rather than the entire frame), where the portions are arbitrary sub-images or are obtained by skipping every $p^{th}$ pixel in the calculation.

The frame is considered noise, and thereby disregarded, if:
Φ≧Noise_average_threshold_high or if
Φ≦Noise_average_threshold_low or if
Ψ≦Variance_average_threshold In other words, if the average is above or below a certain level (e.g., a threshold), or if the variance is less than expected for a normal finger, it may indicate—depending on the sensor used—that no finger exists on the device at that moment. In the preferred embodiment, typical values of these thresholds are:

Noise_average_threshold_high=240
Noise_average_threshold_low=30
Variance_average_threshold=10

Note that other values can be used to tune the algorithm to the desired performance, and other more complicated combinations of the above statistics can also be used to determine the usefulness of a frame. Of course, other metrics, alone or in combination with the above, can also be used.

Once the current frame has been found useful, it is next correlated to the last useful frame (stored in the step 251) to determine the finger movement, if any, that occurred. Once it is determined that finger movement has occurred, the last useful frame (step 251) is replaced by the current frame and the algorithm continues by acquiring a new frame from the sensor.

In accordance with the present invention, a new frame ("cF") is correlated with an older one stored in memory ("oF"). Correlation is well known by any person skilled in the art, but it is described in more detail here to better explain the present invention.

Standard cross-correlation SCC of row R of the last useful frame with row S of the current frame is mathematically expressed as:

$$\text{SCC\_whole}(R, S, d) = \sum_{m=d+1}^{M-d} (oF[R, m] \times cF[S, m-d]) \quad \text{[Equation 1]}$$

where d is referred to as the "lag" or "offset." The lag is related to the horizontal movement of the data in one frame with respect to the data in another, and can also be thought of as a velocity. Typically, the lag is $-L<=d<=+L$, where L is much less than M. All of the equations in this description are written assuming d>=0 to keep the equations clear. It will be appreciated, however, that negative lag values can be processed by interchanging the column indices on oF and cF as shown below:

$$\text{SCC\_whole}(R, S, d) = \sum_{m=|d|+1}^{M-|d|} (oF[R, m-|d|] \times cF[S, m])$$

where $|d|$ is the absolute value of d.

This interchange method is valid for all correlation equations in this document, not just SCC but also normalized cross-correlation NCC, discussed below.

Though it is feasible to use standard correlation, the preferred embodiment uses a slightly modified version of the correlation called Normalized Cross Correlation NCC, defined in Equation 2 below, which is better suited to image registration tasks like fingerprint image reconstruction. Unlike standard correlation, NCC is invariant to changes in image intensity, has a range that is independent of the number of pixels used in the calculation, and is more accurate because it is less dependent on local properties of the image frames being correlated.

$$\text{NCC\_whole}(R, S, d) = \quad \text{[Equation 2]}$$

$$\frac{\sum_{m=d+1}^{M-d} \left[ \frac{\{oF[R, m] \times cF[S, m-d]\}}{(M-2d)} \right] - \frac{oFsum[R, d]}{(M-2d)} \times \frac{cFsum[S, d]}{(M-2d)}}{\sqrt{\left[ \left\{ \sum_{m=d+1}^{M-d} \frac{\{oF[R, m]\}^2}{(M-2d)} \right\} - \left\{ \frac{oFsum[R, d]}{(M-2d)} \right\}^2 \right] \times \left[ \left\{ \sum_{m=d+1}^{M-d} \frac{\{cF[S, m-d]\}^2}{(M-2d)} \right\} - \left\{ \frac{cFsum[S, d]}{(M-2d)} \right\}^2 \right]}}$$

where:

$$oFsum[R, d] = \sum_{m=d+1}^{M-d} \{oF[R, m]\}$$

is the sum along the row R from column d+1 through column M−d, and $$cFsum[S, d] = \sum_{m=1}^{M-2d} \{cF[S, m]\}$$

is the sum along row S from column 1 through column M−2d.

The above equations are in terms of rows of each frame, but it is more general to think of "patches" of each frame, where a patch can be some subset or superset of a row. While the patches of each frame to be correlated can be any arbitrary set of pixels, the preferred embodiment uses a patch centered in the middle of each frame. While any row or subset of a row could be used, if the patch is too small, the statistical significance of the cross-correlation value will erode.

Since the lag, or offset, of the information in the current frame to that in the last frame corresponds to an unknown amount of movement in the x-direction, NCC_whole(R,S,d) must typically be calculated for multiple values of d to find the one that corresponds to the best fit. Therefore, in one embodiment:

Peak$NCC_{whole}$(R,S,L)=MAX{NCC_whole(R,S,d)} for d=−L to d=L.   [Equation 3]

$d_{peakwhole}$(R,S,L)=the value of d at which the above equation is satisfied.

In the preferred embodiment, L=8, but L should be chosen so that it is as large as the maximum x-velocity that can occur from frame to frame. A smaller L is more computationally efficient, but will produce inaccurate results if the finger shifts more than ±L from one frame to the next. In an alternative embodiment, L can be a function of the $d_{peakwhole}$ from the previous iteration i−1. For example, L(at iteration $i$)=$d_{peakwhole}$(at iteration $i$−1)+$e$, where $e$ is typically equal to 1 or 2.

In yet another embodiment, L can be a function of the row number in the frame (i.e. R and/or S). Also note that it is possible to use scaled versions of the NCC equations so that floating-point operations can be avoided, and that for computing purposes it is also possible to use NCC-squared to avoid an expensive square-root operation.

The $PeakNCC_{whole}$ corresponds to the correlation coefficient of the best fit, while $d_{peakwhole}$ corresponds to the amount of movement in the x direction. A method to obtain the amount of motion in the y direction is described below.

The NCC calculation in Equation 2 below can be restated, for last frame oF and current frame cF, $$NCC\_whole(R, S, d) = \frac{\sum_{m=d+1}^{M-d}\left[\frac{\{oF[R,m] \times cF[S, m-d]\}}{(M-2d)}\right] - \frac{oFsum[R,d]}{(M-2d)} \times \frac{cFsum[S,d]}{(M-2d)}}{\sqrt{\left[\left\{\sum_{m=d+1}^{M-d}\frac{\{oF[R,m]\}^2}{(M-2d)}\right\} - \left\{\frac{oFsum[R,d]}{(M-2d)}\right\}^2\right] \times \left[\left\{\sum_{m=d+1}^{M-d}\frac{\{cF[S,m-d]\}^2}{(M-2d)}\right\} - \left\{\frac{cFsum[S,d]}{(M-2d)}\right\}^2\right]}}$$

[Equation 2]

as:

$$NCC\_whole(R, S, d) = \frac{\left[(M-2d)\sum_{m=d+1}^{M-d}\left[\{oF[R,m] \times cF[S,m-d]\}\right]\right] - oFsum[R,d] \times cFsum[S,d]}{\sqrt{\left[\left\{(M-2d)\sum_{m=d+1}^{M-d}\{oF[R,m]\}^2\right\} - \{oFsum[R,d]\}^2\right] \times \left[\left\{(M-2d)\sum_{m=d+1}^{M-d}\{cF[S,m-d]\}^2\right\} - \{cFsum[S,d]\}^2\right]}}$$

where the numerator and denominator have both been multiplied by $(M-2d)^2$ to make it simpler to compute and understand.

This can be separated into left and right halves of each row as:

$$NCC\_whole(R,S,d) = (A-B)/(C^{1/2} \times D)$$

where [Equation 4]

$$A = \left[(M-2d)\left\{\sum_{m=d+1}^{M/2}[\{oF[R,m] \times cF[S,m-d]\}] + \sum_{m=M/2+1}^{M-d}[\{oF[R,m] \times cF[S,m-d]\}]\right\}\right]$$

where $$B = \left\lfloor oFsum_{left}[R,d] + oFsum_{right}[R,d]\right\rfloor \times \left\lfloor cFsum_{left}[S,d] + cFsum_{right}[S,d]\right\rfloor$$

where $$C = \left[(M-2d)\left\{\sum_{m=d+1}^{M/2}\{oF[R,m]\}^2 + \sum_{m=M/2+1}^{M-d}\{oF[R,m]\}^2\right\} - \{oFsum_{left}[R,d] + oFsum_{right}[R,d]\}^2\right]$$

and, where $$D = (M-2d)\left\{\sum_{m=d+1}^{M/2}\{cF[S,m-d]\}^2 + \sum_{m=M/2+1}^{M-d}\{cF[S,m-d]\}^2\right\} - \{cFsum_{left}[S,d] + cFsum_{right}[S,d]\}^2$$

where:

$$oFsum_{right} = \sum_{m=M/2+1}^{M-d}\{oF[R,m]\}$$

is the sum along row R from column M/2+1 through column M−d, $$oFsum_{left} = \sum_{m=d+1}^{M/2} \{oF[R, m]\}$$

is the sum along row R from column d+1 through column M/2, $$cFsum_{right} = \sum_{m=M/2-d+1}^{M-2d} \{cF[S, m]\}$$

is the sum along row S from column M/2−d+1 through column M−2d, and $$cFsum_{left} = \sum_{m=1}^{M/2-d} \{cF[S, m]\}$$

is the sum along row S from column 1 through column M/2−d.

Furthermore, the NCC for the left and right halves of each row can be determined using:

NCC_left(R, S, d) = [Equation 5a]

$$\frac{\left[(M-2d)\left\{\sum_{m=d+1}^{M/2}[\{oF[R, m] \times cF[S, m-d]\}]\right\}\right] - [oFsum_{left}[R, d]] \times [cFsum_{left}[S, d]]}{\sqrt{\left[(M-2d)\left\{\sum_{m=d+1}^{M/2}\{oF[R, m]\}^2\right\} - \{oFsum_{left}[R, d]\}^2\right] \times \left[(M-2d)\left\{\sum_{m=d+1}^{M/2}\{cF[S, m-d]\}^2\right\} - \{cFsum_{left}[S, d]\}^2\right]}}$$

NCC_right(R, S, d) = [Equation 5b]

$$\frac{\left[(M-2d)\left\{\sum_{m=M/2+1}^{M-d}[\{oF[R, m] \times cF[S, m-d]\}]\right\}\right] - [oFsum_{right}[R, d]] \times [cFsum_{right}[S, d]]}{\sqrt{\left[(M-2d)\left\{\sum_{m=M/2+1}^{M-d}\{oF[R, m]\}^2\right\} - \{oFsum_{right}[R, d]\}^2\right] \times \left[(M-2d)\left\{\sum_{m=M/2+1}^{M-d}\{cF[S, m-d]\}^2\right\} - \{cFsum_{right}[S, d]\}^2\right]}}$$

In addition, the PeakNCC for the left and right sides is given by:

PeakNCC$_{left}$(R,S,L)=MAX{NCC_left(R,S,d)}for d=−L to d=L. [Equation 6a]

$d_{peakleft}$(R,S,L)=the value of $d$ at which the above equation is satisfied.

PeakNCC$_{right}$(R,S,L)=MAX{NCC_right(R,S,d)}for d=−L to d=L. [Equation 6b]

$d_{peakright}$(R,S,L)=the value of $d$ at which the above equation is satisfied.

These equations allow the left and right sides of the sensor array to be treated separately, and efficiently determine the rotational movement as described below.

Once all the NCC terms for left and right sides are calculated for the left and right sides in Equations 5a and 5b, only a few addition and division operations are required to calculate NCC_whole for the entire sensing array using Equation 4. Then, overall linear motion can be calculated using Eq. 3 as before, while rotational movement is calculated using the linear motion for the left and right sides of the sensing array.

Using PeakNCC(R,S,L) defined above in Equation 3 or Equations 6a and 6b, the calculation of exact x and y motion is straightforward. The last useful frame at iteration i has rows numbered 1 through N, as shown in FIG. 4, where N is the number of rows supplied by the sensor. Similarly, the current frame to be processed has rows 1 through N.

For a given row R in the last frame, PeakNCC and $d_{peak}$ are calculated as in Equations 3, 6a and 6b with respect to rows 1 through N of the current frame, and take the $d_{peak}$ that corresponds to the maximum PeakNCC. Preferably, this is done for two values of R: R=1 and R=N. In this way, both upward and downward motion in the y direction can be determined while maximizing the speed at which a user can move his finger. It is also possible to choose only one R, at R=N/2 (or very near the middle row). However that is sub-optimal. It is also possible to choose values other than 1 or N, such as R=2 and R=N−1, which may be advantageous for accuracy reasons since they are not on the edge of the sensor array.

Table 1 shows the pseudo-code for performing a single frame iteration for a given value of R. Although the calculations are carried out separately for the left side, right side, and whole row, only the generic case is described by the pseudo-code in Table 1.

TABLE 1

Step 0: START
Step 1: Set R=1 ///// start with R=1 and then do R=N
Step 2: Set L=8 ///// lag value fixed at 8 columns
Step 3: Set bestS = 0 ///// initialize
Step 4: set MaxPeakNCC = 0 ///// initialize
Step 5: set $d_{peak}$Max = 0 /////initialize
Step 6: Loop from currentRow = 1 through N //loop over N rows of current frame
{
    Step 6.1: set tmp = PeakNCC(R,currentRow,L)
    Step 6.2: if tmp greater than MaxPeakNCC then TABLE 1-continued

```
        {
        Step 6.3: set MaxPeakNCC = tmp //keep largest
        Step 6.4: set d_peak Max = d_peak(R,currentRow,L)
        Step 6.5: set bestS = currentRow
        Step 6.6: set bestR = R
        }
    }
}
Step 7: if R equals 1 then
    {
        Step 7.1: set R = N
        Step 7.2: Go to Step 2
    }
Step 8: STOP
```

The pseudo-code in Table 1 can be summarized as:

$$\text{MaxPeak}NCC = NCC\_\text{whole}(bestR, bestS, d_{peak}(bestR, bestS, L)) \quad [\text{Equation 6c}]$$

$$d_{peak}\text{Max} = dpeak(bestR, bestS, L) \quad [\text{Equation 6d}]$$

Thus, after the above calculations, the following information is obtained:

1. MaxPeakNCC, the value of the correlation of the best pair of matching rows in the current frame and the last frame
2. bestR, the row of the last frame that results in MaxPeakNCC
3. bestS, the row of the current frame that results in MaxPeakNCC
4. $d_{peak}$Max, the correlation lag where MaxPeakNCC is reached bestR and bestS are the pair of rows that yield the highest correlation value (MaxPeakNCC).

Typically, MaxPeakNCC will be close to 1.0 (the closer to 1.0, the stronger the correlation), but if the finger being analyzed is moved too quickly, it is possible that the current frame does not have any rows in common with the last frame (i.e. a non-overlapping case). Therefore, MaxPeakNCC must be checked to ensure that it is large enough.

Using the above information, the following calculations are performed:

if MaxPeakNCC>corr_threshold:

1. $\Delta x(i) = d_{peak}$Max, which is the x-velocity at iteration i
2. $\Delta y(i) = bestS - bestR$, which is the y-velocity at iteration i otherwise 3. $\Delta x(i) = 0$
4. $\Delta y(i) = 0$ where corr_threshold is used to make sure the correlation is high enough to indicate an overlap at all. Preferably, corr_threshold=0.75, but other values can be used to tune the performance of the algorithm. If the correlation is below a threshold, it is impossible to determine actual values for the x- and y-velocities, so the algorithm simply outputs no motion vector. However, in accordance with alternative embodiments other values can be output as the default, such as maximum movements of N rows and M columns, or combinations thereof.

In any case, after x and y motion have been calculated for the left side, right side, and whole rows for the current iteration i—denoted by $\Delta x_{left}(i)$ and $\Delta y_{left}(i)$; $\Delta x_{right}(i)$ and $\Delta y_{right}(i)$; $\Delta x_{whole}(i)$ and $\Delta y_{whole}(i)$, respectively—are calculated, the rotational movement $\Delta theta(i)$ can now be determined.

The $\Delta x_{whole}(i)$ and $\Delta y_{whole}(i)$ are made available to the host requiring the rotational information, and represent the overall linear x- and y-motion.

Table 2 shows the pseudo code for determining rotational movement. The pseudo code continues iterating until told to stop by the application program or operating system using the rotational data.

TABLE 2

```
Step 0: START
Step 1: set cumulativeDelY_left (0) = 0
Step 2: set cumulativeDelY_right (0) = 0
Step 3: Loop from iteration i = 1 through infinity
    {
    Step 3.1: Acquire a frame and calculate Δy_left (i) and Δy_right (i)
    Step 3.2: Set cumulativeDelY_left (i)=cumlativeDelY_left (i-1)+Δy_left (i)
    Step 3.3: Set cumulativeDelY_right (i)=cumlativeDelY_right (i-1)+Δy_right (i)
    Step 3.4: If absolute value (cumulativeDelY_left (i) -
                cumulativeDelY_right (i)) >= THRESH,
             then
             {
                Step 3.5: Set Δtheta (i) = [cumulativeDelY_left (i) -
                    cumulativeDelY_right (i)]
                Step 3.6: Set cumulativeDelY_left (i) = 0
                Step 3.7: Set cumulativeDelY_right (i) = 0
             }
             Else:
                Step 3.8: Set Δtheta (i) = 0
    }
where THRESH can be any value >= 1. Preferably, THRESH=1.
```

It will be appreciated that there are alternative ways to compute the rotational delta, including arbitrary functions of the $\Delta y_{left}(i)$ and $\Delta y_{right}(i)$. For alternative mountings of the sensor, where the x and y directions are transposed, $\Delta x_{left}(i)$ and $\Delta x_{right}(i)$ are used in the pseudo code in Table 2. On full size placement sensors, more accuracy can be achieved using both $\Delta x_{left}(i)$, $\Delta x_{right}(i)$ and $\Delta y_{left}(i)$, $\Delta y_{right}(i)$. This is achieved in one embodiment by calculating a $\Delta theta(i)$ using the pseudo code in Table 2 using $\Delta x$ values and again using $\Delta y$ values. The resulting two estimated values can be averaged together or otherwise combined to form the final $\Delta theta(i)$. The $\Delta theta(i)$ are made available to the host application and/or operating system.

In other embodiments a standard correlation is used instead of normalized cross correlation. Standard cross correlation given in Equation 1 could be used instead of Normalized Cross Correlation. It is straightforward to split Equation 1 into terms from the left and right sides of each row.

$$SCC\_whole(R, S, d) = \sum_{m=d+1}^{M/2} (oF[R, m] \times cF[S, m-d]) + \sum_{m=M/2+1}^{M-d} (oF[R, m] \times cF[S, m-d]) \quad [\text{Equation 7}]$$

In this case, which is much simpler than the NCC case in the preferred embodiment, the SCC value for the entire row is simply the sum of the correlation values of each half.

It will also be appreciated that the maximum standard cross-correlation between a row S of a frame and a row R of the last useful frame can be given by other expressions. For example, weighted or voting schemes can be used. In one embodiment, $$PeakSCC_{whole}(R,S,L) = \text{Weighted}\_MAX\{SCC\_\text{Whole}(R, S,d)\} \text{ for } d=-L \text{ to } d=L \quad [\text{Equation 8}]$$

where Weighted_MAX is a function that assigns a plurality of predetermined weights to its elements before generating a value, $d_{peakwhole}(R,S,L)$ is the value of d at which Equation 8 is satisfied, and L is approximately equal to the maximum horizontal speed from the last useful frame to the current frame.

While the preferred embodiment splits each row into a left and right side of equal length, alternative embodiments use any arbitrary division of each row, including more than 2 equal parts instead of 2, and also using divisions that are of differing length. It is also not necessary to have each division touch the next. FIGS. 8-12 show some of the possibilities, each with advantages over the other.

Figure 8:
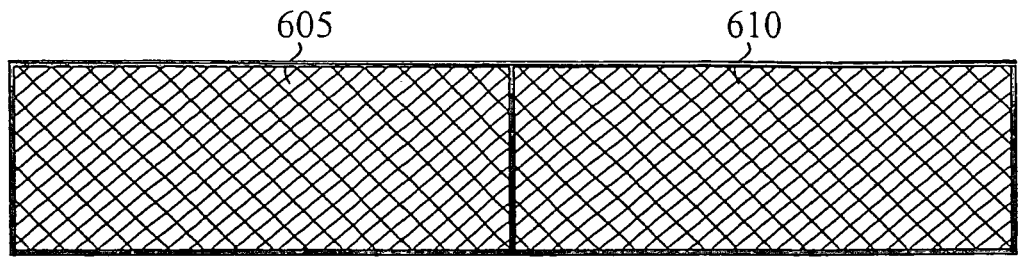
FIGS. 8-12 show different partition configurations of a frame in accordance with the present invention.
Figure 9:
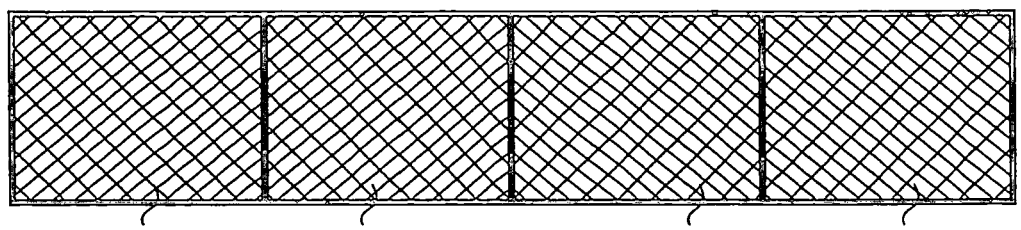
Figure 10:
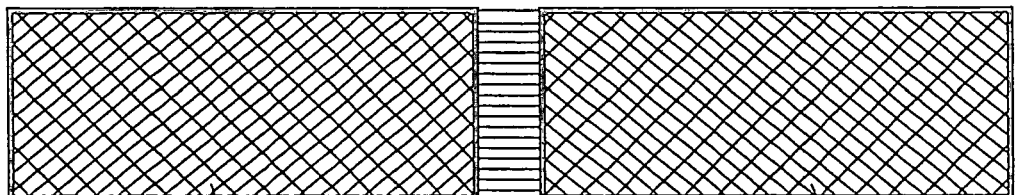
Figure 11:
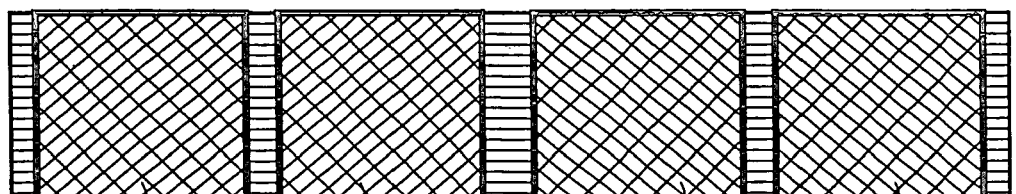
Figure 12:
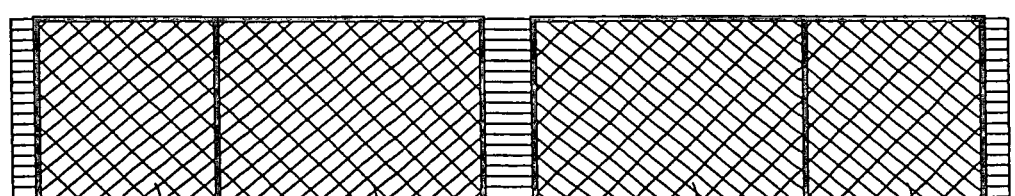

For example, FIG. 8 shows a fingerprint sensor having a left half (sub-frame) 605 contiguous with a right half 610. FIG. 9 shows a fingerprint sensor having a first section (sub-frame) 615, a second section 620, a third section 625, and a fourth section 630. Section 615 is contiguous with section 620, section 620 is contiguous with 625, and section 625 is contiguous with section 630. FIG. 10 shows a finger image sensor having two sections 631 and 632 that are not contiguous. FIG. 11 shows a finger image sensor having four sections 635, 640, 645, and 650, none of which are contiguous. And FIG. 12 shows a finger image sensor having a section 655 contiguous with a section 660, and a section 665 contiguous with a section 670. It will be appreciated that other configurations are also possible, each preferably having more than one single division and using linear correlation to determine rotational movement. The number and configurations of the sections can be chosen based on production cost, surface area of the finger image sensor, computational algorithms, processor configuration, speed required, and other criteria.

In other embodiments, it is desirable to modify the raw values $\Delta x_{whole}(i)$, $\Delta y_{whole}(i)$, and $\Delta theta(i)$ before sending it to the host. These types of modifications involve three different mathematical transformations, generically called filtering, where the transformed output is noted by the ' notation:

1. Scaling; applying a linear or non-linear scaling factor to multiply the original movement valuea to obtain scaled versions more appropriate to the displayed coordinate system of the host. An example is to multiply all values by a factor of 2. Another example is to multiply x movement by a factor of 2 and y movement by a factor of 0.5.
2. Smoothing: applying a smoothing (low-pass) filter to successive movement values in order to make the values less jagged over time. Examples are:

Linear Average=$\Delta x'_{whole}(i)$=[$\Delta x_{whole}(i)$+$\Delta x_{whole}(i-1)$+ $\Delta x_{whole}(i-2)$]/3

Exponential average=$\Delta theta'(i)$=[$\Delta theta'(i-1)$+$\Delta theta(i)$]/2

3 Clipping: limiting values of the movement to arbitrary values. An example is:

If$\Delta y(i)>T$,then $\Delta y'(i)=T$. Otherwise$\Delta y'(i)=\Delta y(i)$.

These operations can be combined in many ways in accordance with the present invention. Here, "filtering" is used to describe the function of processing an input in a well-defined way to produce an output.

Those skilled in the art will recognize that correlation is computationally intensive. Accordingly, in one embodiment, the calculation of $\Delta theta(i)$ and/or the $\Delta x(i)$, $\Delta y(i)$ for the left, right, and whole array are performed on a separate processor or dedicated hardware. In this embodiment, the hardware can be integrated into the silicon fingerprint sensor itself. The hardware performing the correlation must have access to the current frame and the last useful frame, both of which can be stored in memory on the device. If, for example, this is integrated into the finger image sensor, such a device would obviously have access to the current frame (since the device itself created it), and it could save the last useful frame in volatile memory registers. In such a case the device would also need to determine whether a frame is useful or not, using the method described here in the preferred embodiment. In such an embodiment the host computing device is not necessary. Obviously, such a hardware implementation could also be used to reconstruct fingerprint images since doing so only requires the $\Delta x(i)$ and $\Delta y(i)$ for the whole array.

It will be readily apparent to one skilled in the art that various modifications may be made to the embodiments without departing from the spirit and scope of the invention as defined by the appended claims.

We claim:

1. A method of obtaining rotation information, the method comprising:
    capturing a plurality of patterned images from a plurality of areas on a sensor that include first and second areas of the sensor;
    correlating the plurality of patterned images from the first area, using a processor, to generated a first set of linear differences containing a first element corresponding to movement within the first area a distance along a first axis and from the second area to generate a second set of linear differences containing a first element corresponding to movement within the second area a distance along the first axis; and
    comparing corresponding elements in the first and second sets of linear differences to generate the rotation information.

2. The method of claim 1, wherein the first and second areas comprise first and second parts of the sensor.

3. The method of claim 2, wherein a first of the plurality of patterned images is captured in the first part of the sensor and a second of the plurality of patterned images is captured in the second part of the sensor.

4. The method of claim 3, wherein the sensor is a biometric image sensor.

5. The method of claim 4, wherein the biometric image sensor is a finger image sensor.

6. The method of claim 5, wherein the first of the plurality of patterned images and the second of the plurality of patterned images together correspond to a fingerprint image in a first position on the sensor.

7. The method of claim 6, wherein a third of the plurality of patterned images is captured in the first part of the sensor and a fourth of the plurality of patterned images is captured in the second part of the sensor.

8. The method of claim 7, wherein the third of the plurality of patterned images and the fourth of the plurality of patterned images together correspond to the fingerprint image in a second position on the sensor.

9. The method of claim 8, wherein the rotation information corresponds to an angular difference between the first position and the second position.

10. The method of claim 9, wherein correlating the plurality of patterned images from the first and second areas comprises:
    correlating the first patterned image with the third patterned image to generate the first set of linear differences;
    correlating the second patterned image with the fourth patterned image to generate the second set of linear differences; and correlating a first combination of the first patterned image and the second patterned image with a second combination of the third patterned image and the fourth patterned image to generate a third set of linear differences.

11. The method of claim 10, wherein correlating the first patterned image with the third patterned image, correlating the second patterned image with the fourth patterned image, and correlating the first combination with the second combination all comprise performing a cross correlation.

12. The method of claim 11, wherein the cross correlation is a normalized cross correlation.

13. The method of claim 11, wherein the cross correlation is a standardized cross correlation.

14. The method of claim 2, wherein the first part of the sensor and the second part of the sensor are contiguous.

15. The method of claim 2, wherein the first part of the sensor and the second part of the sensor are not contiguous.

16. The method of claim 11, wherein the first part of the sensor comprises a first sub-frame of pixels and the second part of the sensor comprises a second sub-frame of pixels.

17. The method of claim 16, wherein capturing the first patterned image comprises storing in the first sub-frame first data corresponding to the first patterned image, capturing the second patterned image comprises storing in the second sub-frame second data corresponding to the second patterned image, capturing the third patterned image comprises storing in the first sub-frame third data corresponding to the third patterned image, and capturing the fourth patterned image comprises storing in the second sub-frame fourth data corresponding to the fourth patterned image.

18. The method of claim 17, wherein correlating the first patterned image with the third patterned image comprises correlating the first data with the third data to generate first and second linear differences from the first set of linear differences.

19. The method of claim 18, wherein correlating the second patterned image with the fourth patterned image comprises correlating the second data with the fourth data to generate first and second linear differences from the second set of linear differences.

20. The method of claim 19, wherein correlating the first combination with the second combination comprises correlating a combination of the first data and the second data with a combination of the third data and the fourth data to generate first and second linear differences from the third set of linear differences.

21. The method of claim 20, wherein correlating comprises determining a lag to correlate elements of one of the first and the second sub-frames, the lag and a difference between the elements corresponding to first and second linear differences from one of the sets of linear differences.

22. The method of claim 21, wherein each element corresponds to a row of one of the first and the second sub-frames.

23. The method of claim 21, wherein each element corresponds to a column of one of the first and the second sub-frames.

24. The method of claim 11, further comprising filtering the first set of linear differences, the second set of linear differences, the third set of linear differences, and the rotation information.

25. The method of claim 24, wherein filtering comprises multiplying by a scaling factor.

26. The method of claim 25, wherein filtering further comprises performing a smoothing function.

27. The method of claim 26, wherein filtering further comprises performing a clipping function.

28. The method of claim 10, wherein the finger image sensor is a finger placement sensor.

29. The method of claim 10, wherein the finger image sensor is a finger swipe sensor.

30. The method of claim 9, further comprising using the rotation information on a host platform having a display screen, the rotation information used to rotate an object on the display screen, thereby emulating a computer input device.

31. The method of claim 30 wherein the computer input device is selected from the group consisting of a steering wheel, a joystick, and a navigation bar.

32. The method of claim 30, wherein emulating a computer input device comprises moving the object on the display screen at a rate related to the angular difference.

33. A system for obtaining rotation information, the system comprising:
    means for capturing a plurality of patterned images from first and second areas; and
    means for correlating the plurality of patterned images from the first area to generate a first set of linear differences containing a first element corresponding to movement within the first area a distance along a first axis and from the second area to generate a second set of linear differences containing a first element corresponding to movement within the second area a distance along the first axis; and
    means for comparing corresponding elements in the first and second sets of linear differences to generate the rotation information.

34. The system of claim 33, wherein the means for capturing comprises a sensor having a first part corresponding to the first area and a second part corresponding to the second area.

35. The system of claim 34, wherein the sensor is a biometric image sensor.

36. The system of claim 35, wherein the biometric image sensor is a finger image sensor.

37. The system of claim 36, wherein the first part of the sensor is configured to capture a first of the plurality of patterned images and the second part of the sensor is configured to capture a second of the plurality of patterned images.

38. The system of claim 37 wherein the first of the plurality of patterned images and the second of the plurality of patterned images together correspond to a fingerprint image in a first position.

39. The system of claim 38, wherein the first part of the sensor is further configured to capture a third of the plurality of patterned images and the second part of the sensor is further configured to capture a fourth of the plurality of patterned images.

40. The system of claim 39, wherein the third of the plurality of patterned images and the fourth of the plurality of patterned images together correspond to the fingerprint image in a second position.

41. The system of claim 40, wherein the rotation information corresponds to an angular difference between the first position and the second position.

42. The system of claim 40, wherein correlating the plurality of patterned images from the first and second areas comprises:
    correlating the first patterned image with the third patterned image to generate the first set of linear differences;
    correlating the second patterned image with the fourth patterned image to generate the second set of linear differences; and
    correlating a first combination of the first patterned image and the second patterned image with a second combination of the third patterned image and the fourth patterned image to generate a third set of linear differences.

43. The system of claim 42, wherein correlating the first patterned image with the third patterned image, correlating the second patterned image with the fourth patterned image, and correlating the first combination with the second combination all comprise performing a cross correlation.

44. The system of claim 43, wherein the cross correlation is a normalized cross correlation.

45. The system of claim 43, wherein the cross correlation is a standardized cross correlation.

46. The system of claim 34, wherein the first part of the sensor and the second part of the sensor are contiguous.

47. The system of claim 34, wherein the first part of the sensor and the second part of the sensor are not contiguous.

48. The system of claim 43, wherein the first part of the sensor comprises a first sub-frame of pixels and the second part of the sensor comprises a second sub-frame of pixels.

49. The system of claim 48, wherein capturing a patterned image comprises storing in the first sub-frame first data corresponding to the first patterned image, capturing the second patterned image comprises storing in the second sub-frame second data corresponding to the second patterned image, capturing the third patterned image comprises storing in the first sub-frame third data corresponding to the third patterned image, and capturing the fourth patterned image comprises storing in the fourth sub-frame data corresponding to the fourth patterned image.

50. The system of claim 49, wherein correlating the first patterned image with the third patterned image comprises correlating the first data with the third data to generate first and second linear differences from the first set of linear differences.

51. The system of claim 50, wherein correlating the second patterned image with the fourth patterned image comprises correlating the second data with the third data to generate first and second linear differences from the second set of linear differences.

52. The system of claim 51, wherein correlating the first combination with the second combination comprises correlating a combination of the first data and the second data with a combination of the third data and the fourth data to generate first and second linear differences from the third set of linear differences.

53. The system of claim 52, wherein correlating comprises determining a lag to correlate elements of one of the first and second sub-frames, the lag and a difference between the elements corresponding to the first and second linear differences from one of the sets of linear differences.

54. The system of claim 53, wherein each element corresponds to a row of one of the first and second sub-frames.

55. The system of claim 53, wherein each element corresponds to a column of one of the first and second sub-frames.

56. The system of claim 33, wherein the means for correlating is further configured for filtering the first set of linear differences, the second set of linear differences, the third set of linear differences, and the rotation information.

57. The system of claim 56, wherein filtering comprises multiplying by a scaling factor.

58. The system of claim 33, wherein the means for capturing comprises a finger placement sensor.

59. The system of claim 33, wherein the means for capturing comprises a finger swipe sensor.

60. The system of claim 41, further comprising a host device coupled to the means for correlating, the host device having a display screen and configured to receive the rotation information and use the rotation information to control an object on the display screen, thereby emulating a computer input device.

61. The system of claim 60, wherein the computer input device is selected from the group consisting of a steering wheel, a joystick, and a navigation bar.

62. The system of claim 61, wherein the host device is a portable device.

63. The system of claim 62, wherein the portable device is a device selected from the group consisting of a personal computer, a portable telephone, a portable electronic game device, and a digital camera.

64. The system of claim 60, wherein emulating a computer input device comprises moving the object on the display screen at a rate proportional to the angular difference.

65. The system of claim 41, further comprising a host device integral with at least one of the means for capturing and the means for correlating.

66. A method of emulating a rotational device using a pattern, the method comprising:
   a. capturing a first image of the pattern at a first orientation on a sensor, wherein the first image has first and second portions;
   b. capturing a second image of the pattern at a second orientation on the sensor, wherein the second image has third and fourth portions;
   c. correlating the first and third portions, using a processor, to calculate a second set of linear differences corresponding to linear movement between the first and third portions and the second and fourth portions to calculate a second set of linear differences corresponding to linear movement between the second and third portions;
   d. determining differences between corresponding elements of the first and second sets of linear differences to determine rotational data; and
   f. using the rotational data to emulate the movement of a rotational device.

67. The method of claim 66, wherein the image comprises a fingerprint image.

68. The method of claim 67, wherein the rotational device is further configured to emulate a linear positioning device.

69. A method of sensing movement of an object on an image sensor comprising:
   a. sensing first and second portions of a first image of the object on an image sensor;
   b. sensing third and fourth portions of a second image of the object on the image sensor; and
   c. comparing, using a processor, linear difference between the first portion and the third portion corresponding to linear movement between the first and third portions and comparing linear differences between the second portion and the fourth portion corresponding to linear movement between the second and fourth portions to determine whether the object rotated.

70. The method of claim 1, wherein the first and second sets of linear differences each comprises a horizontal displacement and a vertical displacement.

71. A method of determining an angular difference between images of a finger at different positions on a finger sensor comprising:
   capturing images of the finger in first and second positions on a finger sensor, wherein in the first position, first and second portions of an image of the finger are captured in first and second locations of the finger sensor, respectively, and in the second position, third and fourth portions of an image of the finger are captured in the first and second locations, respectively;

correlating the first and third portions, using a processor, to generate a first set of linear differences, correlation the second and fourth portions to generate a second set of linear differences, and correlating a combination of the first and second portions with a combination of the third and fourth portions to generate a third set of linear differences; and comparing the first and second sets of linear differences to determine an angular difference between the first and second positions.

72. A system for determining an angular difference comprising:

a finger sensor configured to capture images of the finger in first and second positions, wherein in the first position, first and second portions of an image of the finger are captured in first and second locations of the finger sensor, respectively, and in the second position, third and fourth portions of an image of the finger are captured in the first and second locations, respectively; and a processor coupled to the finger sensor and configured to correlate the first and third portions to generate a first set of linear differences, to correlate the second and fourth portions to generate a second set of linear differences, and to correlate a combination of the first and second portions with a combination of the third and fourth portions to generate a third set of linear differences, wherein the processor is further configured to compare the first and second sets of linear differences to determine an angular difference between the first and second positions.

73. The method of claim 1, wherein the first set of linear differences further contains a second element corresponding to movement within the first area a distance along a second axis and the second set of linear differences further contains a second element corresponding to movement within the second area a distance along the second axis.

74. The system of claim 33, wherein the first set of linear differences further contains a second element corresponding to movement within the first area a distance along a second axis and the second set of linear differences further contains a second element corresponding to movement within the second area a distance along the second axis.

* * * * *

UNITED STATES PATENT AND TRADEMARK OFFICE
CERTIFICATE OF CORRECTION

PATENT NO. : 7,587,072 B2  Page 1 of 1
APPLICATION NO. : 10/912655
DATED : September 8, 2009
INVENTOR(S) : Russo et al.

It is certified that error appears in the above-identified patent and that said Letters Patent is hereby corrected as shown below:

| | |
|---|---|
| Column 5, Line 23 | Delete: "bes" <br> Insert: --best-- |
| Column 5, Line 33 | Delete: "it" |
| Column 5, Line 61 | Delete: "and" <br> Insert: --an-- |
| Column 6, Line 14 | Delete: "and" <br> Insert: --an-- |
| Column 6, Line 35 | Insert: --be-- |
| Column 8, Line 41 | Delete: "frame" |
| Column 19, Line 38 | Delete: ";" <br> Insert: --:-- |
| Column 20, Line 24 <br> Claim 1 | Delete: "generated" <br> Insert: --generate-- |
| Column 22, Line 18 <br> Claim 33 | Delete: "and" |
| Column 24, Line 48 <br> Claim 69 | Delete: "difference" <br> Insert: --differences-- |
| Column 25, Line 2 <br> Claim 71 | Delete: "correlation" <br> Insert: --correlating-- |

Signed and Sealed this

Seventeenth Day of August, 2010

David J. Kappos
*Director of the United States Patent and Trademark Office*